US012688373B2

(12) United States Patent
Wu et al.

(10) Patent No.: US 12,688,373 B2
(45) Date of Patent: Jul. 21, 2026

(54) GENERATING SUBJECT LINES FROM KEYWORDS UTILIZING A MACHINE-LEARNING MODEL

(71) Applicant: Adobe Inc., San Jose, CA (US)

(72) Inventors: Suofei Wu, Fremont, CA (US); Jun He, Fremont, CA (US); Zhenyu Yan, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 341 days.

(21) Appl. No.: 18/050,285

(22) Filed: Oct. 27, 2022

(65) Prior Publication Data

US 2024/0143941 A1     May 2, 2024

(51) Int. Cl.
  G06F 40/40     (2020.01)
  G06F 40/295     (2020.01)
  G06N 3/08     (2023.01)

(52) U.S. Cl.
  CPC ............ G06F 40/40 (2020.01); G06F 40/295 (2020.01); G06N 3/08 (2013.01)

(58) Field of Classification Search
  CPC ........ G06F 40/40; G06F 40/295; G06F 40/56; G06F 40/284; G06F 40/30; G06N 3/08; G06N 3/044; G06N 20/00
  See application file for complete search history.

(56) References Cited

U.S. PATENT DOCUMENTS

| | | | | |
|---|---|---|---|---|
| 10,607,042 | B1 * | 3/2020 | Dasgupta | G06F 40/30 |
| 11,481,563 | B2 * | 10/2022 | Wason | G06V 10/82 |
| 2018/0083898 | A1 * | 3/2018 | Pham | H04L 51/046 |
| 2018/0349360 | A1 * | 12/2018 | Mabbu | G06F 40/56 |
| 2019/0236148 | A1 * | 8/2019 | DeFelice | G06N 3/006 |
| 2019/0279409 | A1 * | 9/2019 | Kim | G06F 16/53 |
| 2020/0034432 | A1 * | 1/2020 | Jain | G06N 3/0475 |
| 2020/0034435 | A1 * | 1/2020 | Norouzi | G06N 3/045 |
| 2020/0074013 | A1 * | 3/2020 | Chen | G06N 3/02 |
| 2020/0160612 | A1 * | 5/2020 | Bowen | G06F 30/00 |
| 2021/0097145 | A1 * | 4/2021 | Roy | G06F 40/279 |
| 2021/0192800 | A1 * | 6/2021 | Dutta | G06N 3/092 |
| 2022/0198131 | A1 * | 6/2022 | Makino | G06F 40/30 |

(Continued)

OTHER PUBLICATIONS

S. Saravanan and K. Sudha, "GPT-3 Powered System for Content Generation and Transformation," 2022 Fifth International Conference on Computational Intelligence and Communication Technologies (CCICT), Sonepat, India, (Jul. 8-9, 2022), pp. 514-519 (Year: 2022).*

(Continued)

*Primary Examiner* — Andrew C Flanders
*Assistant Examiner* — Cameron Kenneth Young
(74) *Attorney, Agent, or Firm* — Keller Preece PLLC

(57)     ABSTRACT

The present disclosure relates to systems, methods, and non-transitory computer readable media that utilize machine learning to generate subject lines from subject line keywords. In one or more embodiments, the disclosed systems receive, from a client device, one or more subject line keywords. Additionally, the disclosed systems generate, utilizing a subject generation machine-learning model having learned parameters, a subject line by selecting one or more words for the subject line from a word distribution based on the one or more subject line keywords. The disclosed systems further provide, for display on the client device, the subject line.

15 Claims, 21 Drawing Sheets

100

(56) References Cited

U.S. PATENT DOCUMENTS

| | | | | | |
|---|---|---|---|---|---|
| 2022/0222489 | A1* | 7/2022 | Liu | .......................... | G06N 20/00 |
| 2023/0237277 | A1* | 7/2023 | Reza | ..................... | G06F 40/186 |
| | | | | | 704/9 |
| 2024/0127002 | A1* | 4/2024 | Newman | ................. | G06F 40/20 |

OTHER PUBLICATIONS

Vaswani, Ashish, et al. "Attention is all you need." Advances in neural information processing systems 30 (2017).

Devlin, Jacob, et al. "Bert: Pre-training of deep bidirectional transformers for language understanding." arXiv preprint arXiv:1810. 04805 (2018).

Rothe, Sascha, Shashi Narayan, and Aliaksei Severyn. "Leveraging pre-trained checkpoints for sequence generation tasks." Transactions of the Association for Computational Linguistics 8 (2020): 264-280.

Patrick von Platen; "How to generate text: using different decoding methods for language generation with Transformers"; https:// huggingface.co/blog/how-to-generate; published Mar. 18, 2020.

Holtzman, Ari, et al. "The curious case of neural text degeneration." arXiv preprint arXiv:1904.09751 (2019).

Tran, Luan, Xi Yin, and Xiaoming Liu. "Disentangled representation learning gan for pose-invariant face recognition." Proceedings of the IEEE conference on computer vision and pattern recognition. 2017.

Keskar, Nitish Shirish, et al. "Ctrl: A conditional transformer language model for controllable generation." arXiv preprint arXiv:1909. 05858 (2019).

* cited by examiner

| | Precision | Recall | F1 Score | Support |
|---|---|---|---|---|
| Deal | 0.9270 | 0.9489 | 0.9378 | 1232 |
| Holiday | 0.8678 | 0.9517 | 0.9078 | 207 |
| Product | 0.8697 | 0.8990 | 0.8841 | 1247 |
| Time | 0.9101 | 0.9537 | 0.9314 | 626 |
| Avg / Total | 0.8985 | 0.9312 | 0.9145 | 3312 |

*Fig. 5*

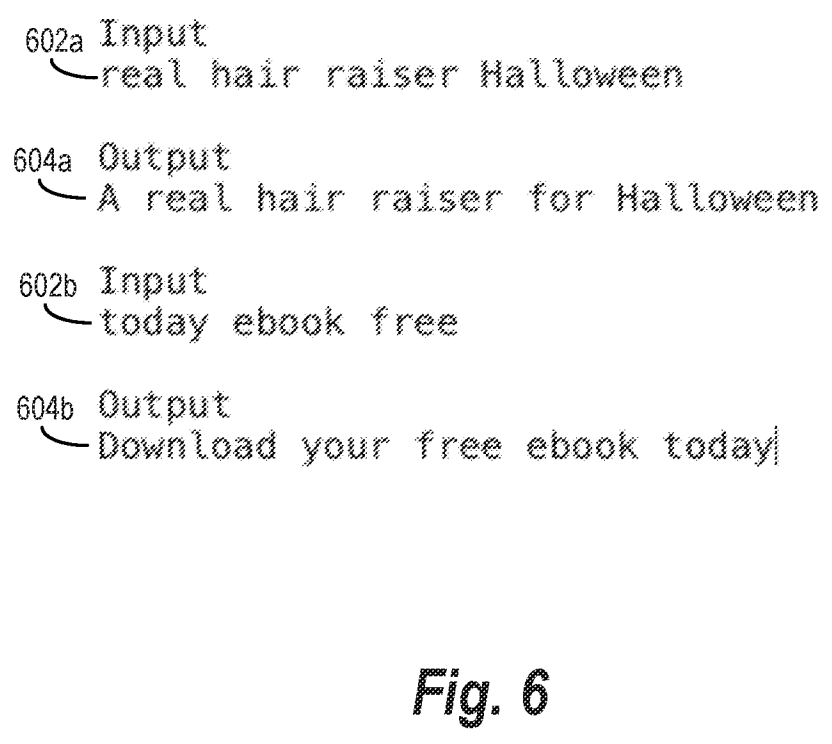

602a Input
   real hair raiser Halloween

604a Output
   A real hair raiser for Halloween

602b Input
   today ebook free

604b Output
   Download your free ebook today

*Fig. 6*

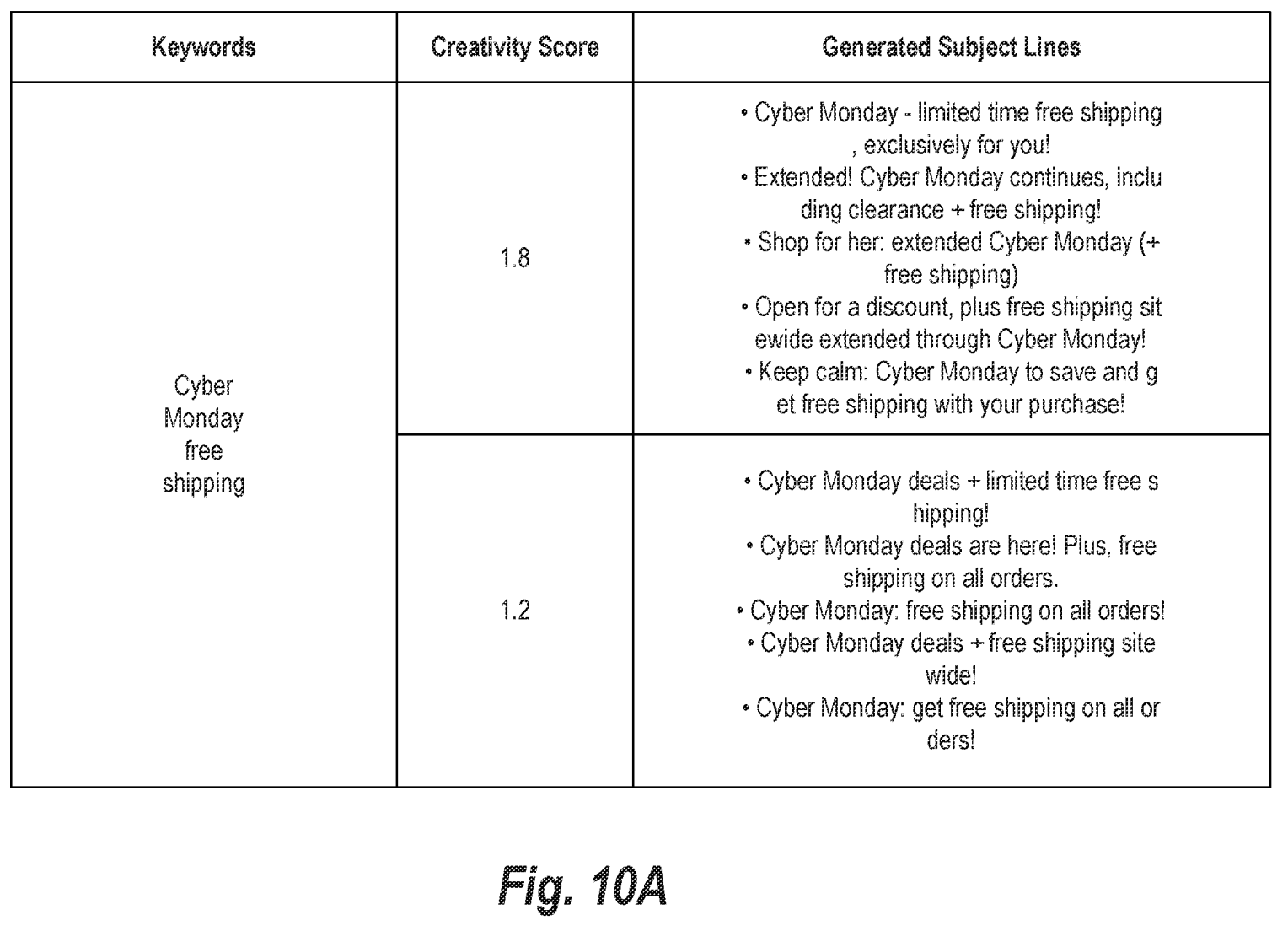

| Keywords | Creativity Score | Generated Subject Lines |
|---|---|---|
| Cyber Monday free shipping | 1.8 | • Cyber Monday - limited time free shipping , exclusively for you!<br>• Extended! Cyber Monday continues, including clearance + free shipping!<br>• Shop for her: extended Cyber Monday (+ free shipping)<br>• Open for a discount, plus free shipping sitewide extended through Cyber Monday!<br>• Keep calm: Cyber Monday to save and get free shipping with your purchase! |
|  | 1.2 | • Cyber Monday deals + limited time free shipping!<br>• Cyber Monday deals are here! Plus, free shipping on all orders.<br>• Cyber Monday: free shipping on all orders!<br>• Cyber Monday deals + free shipping site wide!<br>• Cyber Monday: get free shipping on all orders! |

*Fig. 10A*

| Keywords | Creativity Score | Generated Subject Lines |
|---|---|---|
| 40% off necklace | 1.8 | What will you love for fall (+ get 40% off necklace) |
| Necklace 40% off | 1.8 | Hurry! This Exclusive Necklace is 40% off! |

*Fig. 10B*

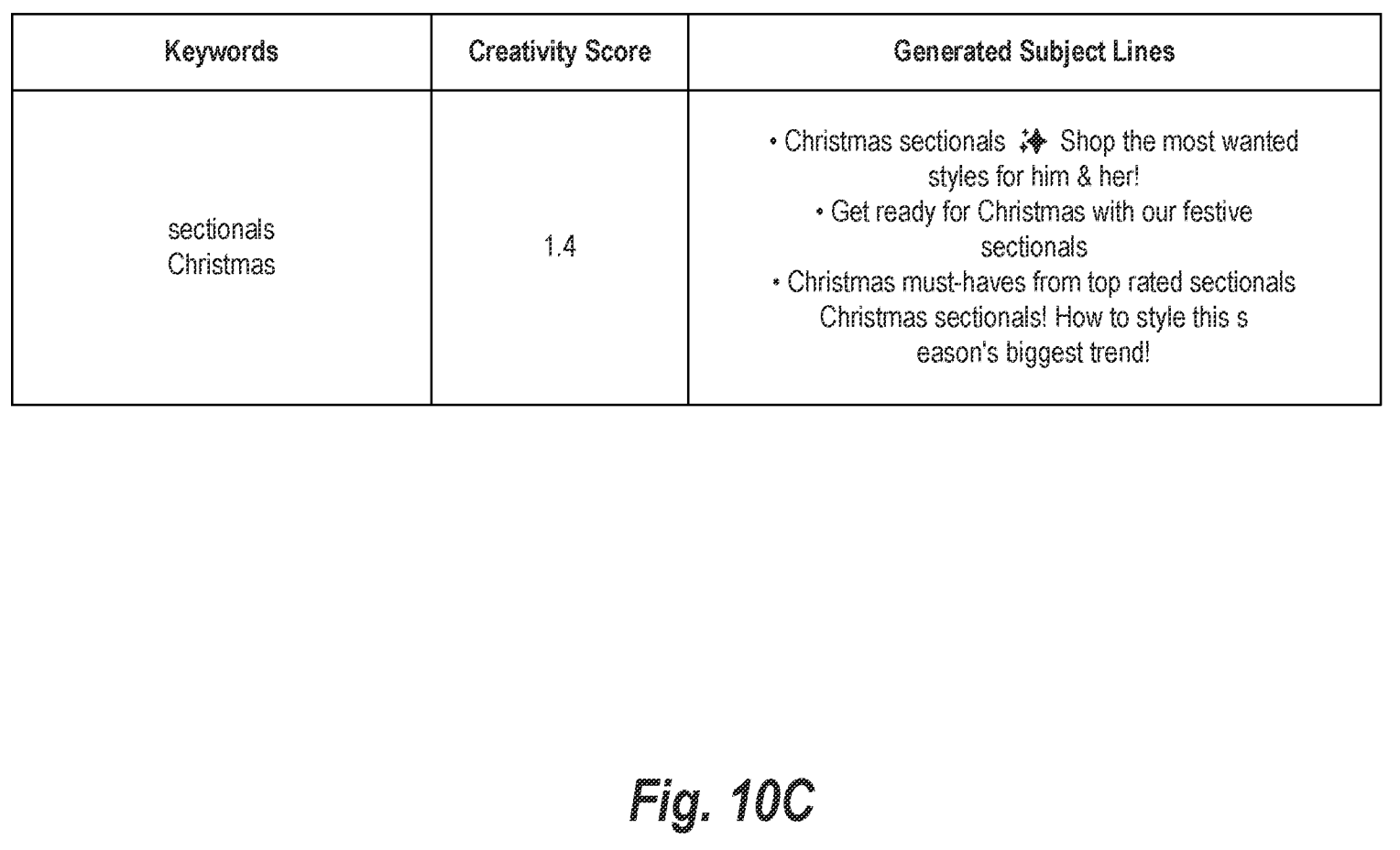

| Keywords | Creativity Score | Generated Subject Lines |
|---|---|---|
| sectionals Christmas | 1.4 | • Christmas sectionals ✨ Shop the most wanted styles for him & her!<br>• Get ready for Christmas with our festive sectionals<br>• Christmas must-haves from top rated sectionals Christmas sectionals! How to style this s eason's biggest trend! |

*Fig. 10C*

| Keywords | Creativity Score | Generated Subject Lines |
|---|---|---|
| today buy one get one free | 1.8 | • Buy one get one free – any 2 products - today only!<br>• Early access ends today. Buy one get one free<br>• We saved this for YOU: Buy one get one free ends today! |

*Fig. 10D*

| Keywords | Creativity Score | Generated Subject Lines |
|---|---|---|
| sunglasses | 1.8 | • Beach day style >> Save on the latest sunglasses ☀<br>• "The sunglasses you can't stop wearing"<br>• Because you deserve some SALE: Switch up color sunglasses |

*Fig. 10E*

| Keywords | Creativity Score | Generated Subject Lines |
|----------|------------------|-------------------------|
| eyeliner | 1.6 | • Your eyeliner has arrived. Let's start the holiday with the right equipment.<br>• Find the perfect eyeliner for your skin type<br>• A liquid eyeliner and a big treat... |

*Fig. 10F*

| Keywords | Creativity Score | Generated Subject Lines |
|---|---|---|
| (blank) | 1.8 | • Introducing new styles, new collections<br>• So many Ways to save? Yes, please!<br>• Our Top 100 Picks, Just for You. (A lot to love.)<br>• Create an exceptionally beautiful life, plus gifts to back-up your style |
| (blank) | 1.6 | • The SALE of your dreams is now online and in store!<br>• Our favorite styles are back in stock + discover our special offer for you!<br>• You have unused credit remaining in your account (it's your lucky day!)<br>• QUICK: more brands added. Limited time selection. 🔔<br>• SHOP THE TOP: Must haves are on sale |

*Fig. 10G*

| Keywords | Blacklist | Creativity Score | Generated Subject Lines |
|---|---|---|---|
| necklace | necklace | 1.5 | • Check out this new jewelry set, plus shop new arrivals!<br>• Our newest jewelry will look great on you!<br>• In case you missed this: Your perfect jewelry is waiting!<br>• The perfect bracelet for every occasion<br>• Looking for the right ring? ☺ |

*Fig. 10H*

| Keywords | Creativity Score | Generated Subject Lines |
|---|---|---|
| Photoshop | 1.4 | Original Model:<br>• There's something about your photoshop!<br>• Did you see our photoshop offer?<br>• This photoshop sale is *almost* gone!<br>• How much will you save on Photoshop?<br>• A special thank you from the photoshop family!<br><br>Customized model:<br>• Bring your creative skills to the next level with Photoshop<br>• Save on Photoshop when you open the app for full-size images.<br>• Paint any picture like Photoshop on your phone<br>• Meet Photoshop's new challenge for day/night-time photos.<br>• The best Photoshop templates you'll ever get |

Receiving Subject Line Keywords *1202*

Generating A Subject Line From The Subject Line Keywords Using A Machine-Learning Model *1204*

Providing The Subject Line To A Client Device *1206*

GENERATING SUBJECT LINES FROM KEYWORDS UTILIZING A MACHINE-LEARNING MODEL

BACKGROUND

In recent years, computer-implemented technologies have improved software platforms for generating digital content, including summaries or descriptions of other digital content. Indeed, as the amount of available digital content has increased over time, platforms have developed to succinctly and attractively describe a larger piece digital content. For instance, the field of electronic communication implements several approaches that facilitate the recommendation of subject lines that convey various aspects of their underlying communications and grab the attention of their readers. Despite these advancements, a number of technical problems exist, particularly with flexibility and efficiency.

SUMMARY

This disclosure describes one or more embodiments of methods, non-transitory computer-readable media, and systems that solve one or more of the foregoing problems and provide other benefits. For example, in one or more embodiments, the disclosed systems utilize artificial intelligence to generate subject lines based on keywords. Indeed, in some embodiments, the disclosed systems implement a machine-learning model to generate the subject lines. In some cases, the machine-learning model generates the subject line from additional inputs, such as a creativity score or a blacklist of words to avoid using. In some implementations, the machine-learning model includes a sequence-to-sequence model. In some instances, the disclosed systems determine the parameters of the sequence-to-sequence model using a named entity recognition model. In this manner, the disclosed systems efficiently learn parameters that facilitate use of the machine-learning model to flexibly generate subject lines based on received input.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 5 illustrates a table reflecting experimental results regarding the effectiveness of the named entity recognition model utilized by the subject line generation system in accordance with one or more embodiments.

FIG. 6 illustrates training subject line keywords utilized by the subject line generation system to determine parameters for a subject generation machine-learning model in accordance with one or more embodiments.

FIGS. 10A-10I each illustrate a table reflecting one or more subject lines generated by the subject line generation system using various received values in accordance with one or more embodiments.

DETAILED DESCRIPTION

Figure 1:
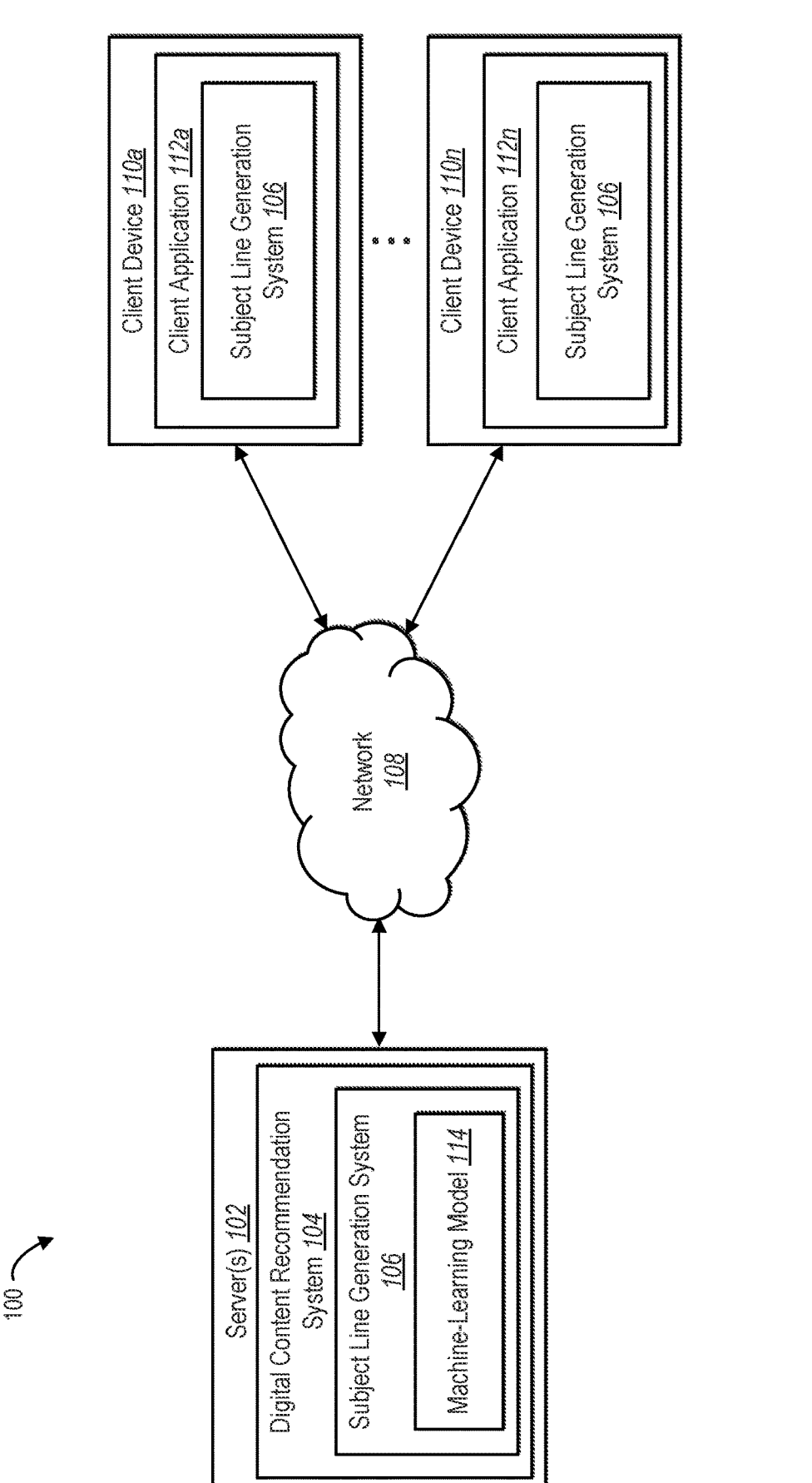
FIG. 1 illustrates an example system environment in which a subject line generation system can operate in accordance with one or more embodiments.

The disclosure describes one or more embodiments of a subject line generation system that utilizes an artificial intelligence framework to flexibly generate subject lines based on received keywords. As suggested above, the field of electronic communications implements various systems that recommend subject lines for use in conjunction with larger pieces of digital content (e.g., email). These conventional subject line recommendation systems, however, suffer from several technological shortcomings.

For instance, many conventional systems are inflexible in that they are limited in how they provide subject line recommendations. To illustrate, some conventional systems receive user-provided subject lines and provide evaluations and suggestions for improvement in return. Such systems, however, base their evaluations on a rigid set of predetermined rules (e.g., number of characters, specific words used, etc.), which can lead to a good evaluation score even when the corresponding subject line does not have a valid meaning. Other conventional systems implement models that generate subject lines from provided keywords using combinations of phrases from a pre-generated pool. The number of available phrases in these pre-generated pools, however, is very limited, leading to the creation of repetitive subject lines despite the keywords that are received.

In addition to the inflexibility of conventional subject line recommendation systems, some existing platforms implement deep generation models for text generation. Such models, however, are inefficient in that they typically require a significant amount of time and computing resources to learn the parameters necessary for generating text. As one example, some conventional systems implement a conditional transformer language (CTRL) model. This model was trained on 140 Gigabytes of text, requiring approximately two weeks to learn the parameters needed to generate satisfactory text. Thus, such models are computationally demanding.

In one or more embodiments, the subject line generation system implements a first machine-learning model within its artificial intelligence framework to generate subject lines from keywords. In some embodiments, the subject line generation system further implements one or more additional machine-learning models within the artificial intelligence framework to facilitate the generation of the subject lines. To illustrate, in some cases, the subject line generation system utilizes the one or more additional machine-learning models to determine the parameters of the first machine-learning model. Accordingly, in some cases, the subject line generation system receives keywords and utilizes the first machine-learning model to generate a subject line using the parameters determined via the one or more additional machine-learning models.

To provide an example, in one or more embodiments, the subject line generation system receives, from a client device, one or more subject line keywords. The subject line generation system generates, utilizing a subject generation machine-learning model (e.g., the first machine-learning model), a subject line from the one or more subject line keywords. Further, the subject line generation system provides, for display on the client device, the subject line.

As just mentioned, in one or more embodiments, the subject line generation system implements an artificial intelligence framework that utilizes machine learning to generate subject lines from subject line keywords. In particular, in some embodiments, the subject line generation system utilizes a subject generation machine-learning model from the artificial intelligence framework to generate the subject lines. In some cases, the subject generation machine-learning model includes a sequence-to-sequence neural network.

As further mentioned above, in one or more embodiments, the subject line generation system utilizes one or more additional machine-learning models from the artificial intelligence framework to determine parameters for the subject generation machine-learning model. For instance, in some cases, the subject line generation system utilizes the one or more additional machine-learning models to provide training input to the subject generation machine-learning model, which is then used in determining the parameters that will be used at inference time.

To illustrate, in one or more embodiments, one of the additional machine-learning models includes a named entity recognition model that extracts keywords from text. In some cases, the subject line generation system trains the named entity recognition model using training data labeled with keyword categories. The subject line generation system uses the trained named entity recognition model to extract keywords from training subject lines. Further, the subject line generation system provides the extracted keywords to the subject generation machine-learning model for use in determining its parameters.

As another example, in some implementations, one of the additional machine-learning models includes an emotion classification neural network that determines one or more emotions (e.g., emotion categories) that are associated with text. In some cases, the subject line generation system trains the emotion classification neural network using training data, such as text that is labeled with emotion indicators. The subject line generation system uses the trained emotion classification neural network to identify emotions associated with training subject lines. Further, the subject line generation system provides the identified emotions to the subject generation machine-learning model for use in determining its parameters.

In some cases, the subject line generation system uses the subject generation machine learning model to generate predicted subject lines from keywords extracted via the named entity recognition model and/or emotions identified via the emotion classification neural network. The subject line generation system further determines the parameters for the subject generation machine-learning models based on the predicted subject lines.

Thus, in one or more embodiments, the subject line generation system receives one or more keywords and utilizes the subject generation machine-learning model to generate a subject line from the one or more keywords. In some cases, the subject line generation system further receives an emotion indicator and utilizes the subject generation machine-learning model to generate the subject line to convey the emotion indicator (e.g., convey the emotion associated with the emotion indicator).

In some implementations, the subject line generation system utilizes the subject generation machine-learning model to generate the subject line further based on one or more additional received inputs. For instance, in some cases, the subject line generation system receives a creativity score and utilizes the subject generation machine-learning model to generate the subject line in accordance with the creativity score. For example, in some embodiments, the subject generation machine-learning model utilizes the creativity score to control the quantity of information included in the subject line.

As another example, in some cases, the subject line generation system receives a blacklist and utilizes the subject generation machine-learning model to generate the subject line in accordance with the blacklist. In some implementations, the blacklist indicates one or more words to avoid using in subject lines. Thus, the subject line generation system omits the one or more words from the generated subject line, even if those words are subject line keywords.

As yet another example, in some cases, the subject line generation system receives one or more custom subject line keywords and utilizes the subject generation machine-learning model to generate the subject line from the one or more custom subject line keywords. In some cases, the subject line generation system performs additional training to modify the parameters of the subject generation machine-learning model to accommodate custom subject line keywords.

In some embodiments, the subject line generation system provides, for display on a client device, a graphical user interface that includes one or more interactive elements for inputting subject line features. For instance, in some cases, the graphical user interface includes interactive elements for inputting subject line keywords, emotion indicators, a creativity score, and/or a blacklist. Further, in some instances, upon generating a subject line from received subject line keywords, the subject line generation system provides the subject line for display within the graphical user interface. In some cases, the subject line generation system provides a plurality of generated subject lines for display and enables the client device to select at least one of the subject lines for use.

The subject line generation system provides several advantages over conventional systems. For example, the subject line generation system provides improved flexibility when compared to conventional subject line recommendation systems. Indeed, by utilizing a subject generation machine-learning model to generate subject lines from subject line keywords, the subject line generation system generates subject lines more flexibly. For instance, the subject line generation system learns to flexibly generate attractive subject lines via machine learning parameters rather than a rigid set of evaluation rules that can lead to nonsensical output. Further, by generating subject lines via a subject generation machine-learning model, the subject line generation system flexibly generates a larger variety of subject lines compared to other systems that tend to provide repetitive outputs using a limited pre-generated pool.

Additionally, the subject line generation system provides improved efficiency when compared to conventional text generation systems that utilize deep generation models. For instance, using a sequence-to-sequence neural network and/ or a named entity recognition model significantly reduces the time required to determine parameters for subject line generation when compared to conventional systems. For instance, using the named entity recognition model significantly reduces the time required to prepare the training data used in determining the parameters of the sequence-to-sequence neural network. Accordingly, the subject line generation system reduces the computing resources (e.g., processing and/or memory resources) required in learning model parameters.

Additional detail regarding the subject line generation system will now be provided with reference to the figures. For example, FIG. 1 illustrates a schematic diagram of an exemplary system environment ("environment") 100 in which a subject line generation system 106 operates. As illustrated in FIG. 1, the environment 100 includes a server(s) 102, a network 108, and client devices 110a-110n.

Although the environment 100 of FIG. 1 is depicted as having a particular number of components, the environment 100 is capable of having any number of additional or alternative components (e.g., any number of servers, client devices, or other components in communication with the subject line generation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 13). Moreover, the server(s) 102 and the client devices 110a-110n include one of a variety of computing devices (including one or more computing devices as discussed in greater detail with relation to FIG. 13).

As mentioned above, the environment 100 includes the server(s) 102. In one or more embodiments, the server(s) 102 generates, stores, receives, and/or transmits digital data including computer-implemented models and/or subject lines. In one or more embodiments, the server(s) 102 comprises a data server. In some implementations, the server(s) 102 comprises a communication server or a web-hosting server.

As shown in FIG. 1, the server(s) 102 includes a digital content recommendation system 104. In one or more embodiments, the digital content recommendation system 104 generates and provides recommendations to other computing devices (e.g., the client devices 110a-110n). In some embodiments, the digital content recommendation system 104 generates and provides a recommendation based on some context. To illustrate, in some implementations, the digital content recommendation system 104 receives one or more inputs from a client device (e.g., one of the client devices 110a-110n) and generates a recommendation based on the input(s). The digital content recommendation system 104 further provides, via the server(s) 102, the recommendation to the client device in response.

Additionally, the server(s) 102 includes the subject line generation system 106. In one or more embodiments, via the server(s) 102, the subject line generation system 106 generates a subject line from one or more subject line keywords. In particular, in some cases, via the server(s) 102, the subject line generation system 106 receives one or more subject line keywords from a client device and generates a subject line in response (e.g., using a machine-learning model 114). Via the server(s) 102, the subject line generation system 106 further provides the subject line for display on the client device. Example components of the subject line generation system 106 will be described below with reference to FIG. 11.

In one or more embodiments, the client devices 110a-110n include computing devices that are capable of providing received input (e.g., subject line keywords) and receiving/displaying generated subject lines. For example, the client devices 110a-110n include one or more of smartphones, tablets, desktop computers, laptop computers, head-mounted-display devices, and/or other electronic devices. In some instances, the client devices 110a-110n include one or more applications (e.g., the client applications 112a-112n, respectively) that are capable of providing received input (e.g., subject line keywords) and receiving/displaying generated subject lines. For example, in one or more embodiments, the client applications 112a-112n include a software application installed on the client devices 110a-110n, respectively. Additionally, or alternatively, the client application 112 includes a web browser or other application that accesses a software application hosted on the server(s) 102 (and supported by the digital content recommendation system 104).

The subject line generation system 106 can be implemented in whole, or in part, by the individual elements of the environment 100. Indeed, as shown in FIG. 1, the subject line generation system 106 can be implemented with regard to the server(s) 102 and/or at the client devices 110a-110n. In particular embodiments, the subject line generation system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the subject line generation system 106 on the client devices 110a-110n represents and/or provides the same or similar functionality as described herein in connection with the subject line generation system 106 on the server(s) 102. In some implementations, the subject line generation system 106 on the server(s) 102 supports the subject line generation system 106 on the client devices 110a-110n.

For example, in some embodiments, the subject line generation system 106 on the server(s) 102 train one or more machine learning models described herein (e.g., the machine-learning model 114). The subject line generation system 106 on the server(s) 102 provides the one or more trained machine learning models to the subject line generation system 106 on the client devices 110a-110n for implementation. Accordingly, although not illustrated, in one or more embodiments the client devices 110a-110n utilize the one or more trained machine learning models to generate subject lines from subject line keywords.

In some embodiments, the subject line generation system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provide input to the server(s) 102 (e.g., subject line keywords). In response, the subject line generation system 106 on the server(s) 102 utilizes the trained machine learning models to generate subject lines from the subject line keywords. The server(s) 102 then provides the subject lines to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102, bypassing the network 108. As another example, the environment 100 includes a third-party server comprising a content server and/or a data collection server.

Figure 2:
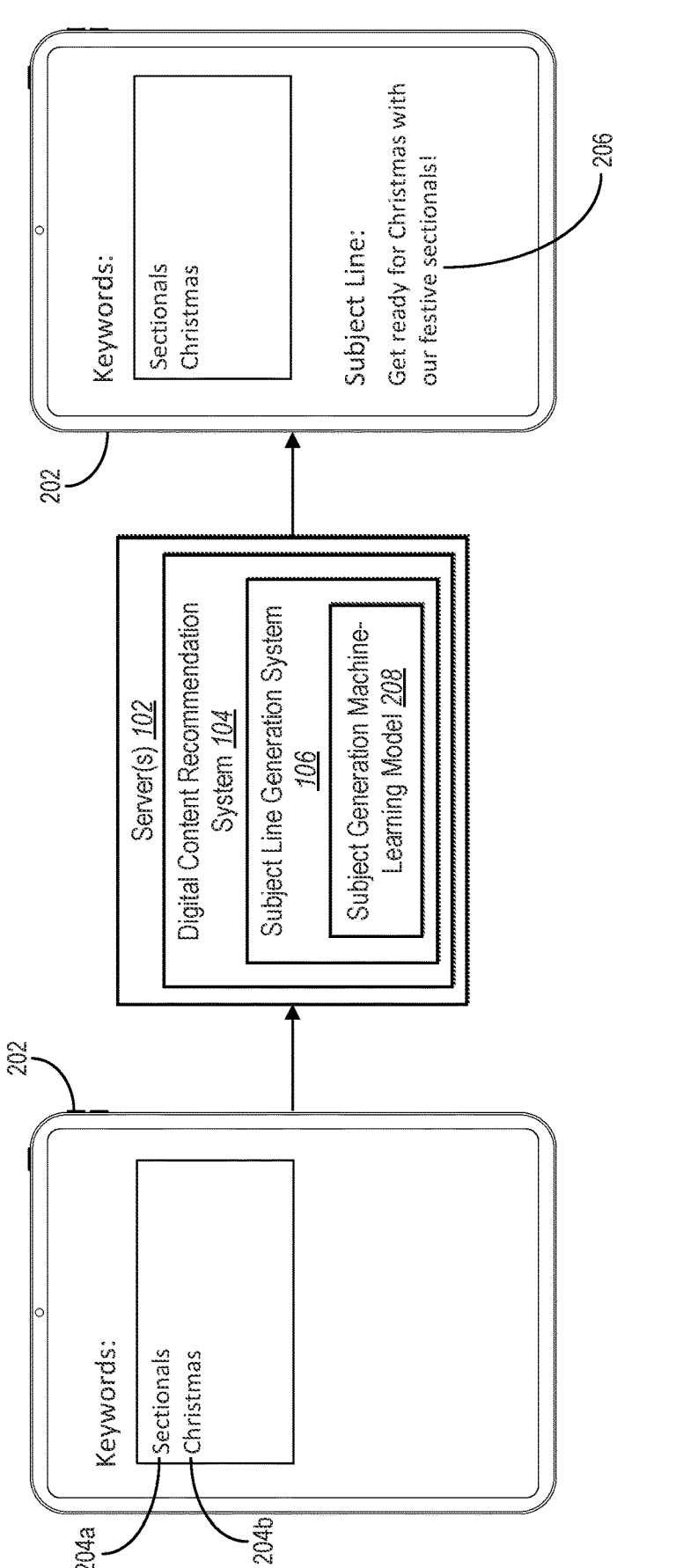
FIG. 2 illustrates an overview diagram of the subject line generation system generating a subject line from subject line keywords in accordance with one or more embodiments.

As mentioned above, the subject line generation system 106 generates subject lines from one or more subject line keywords. In particular, in some embodiments, the subject line generation system 106 generates subject lines via machine learning. FIG. 2 illustrates an overview diagram of the subject line generation system 106 generating a subject line from a subject line keyword via machine learning in accordance with one or more embodiments.

In one or more embodiments, a subject line includes a set of textual elements. In particular, in some embodiments, a subject line includes a line of text—including one or more words, sentences, sentence fragments, and/or punctuation— that conveys a statement or a question. For instance, in some implementations, a subject line is associated with a communication (e.g., an email) or another body of text and summarizes or describes the contents or message contained therein. In some instances, a subject line includes a combination of text and one or more additional elements. For instance, in at least one embodiment, a subject line includes a combination of text and at least one graphical element.

As shown in FIG. 2, the subject line generation system 106 receives, from a client device 202, subject line keywords 204a-204b. In one or more embodiments, a subject line keyword includes one or more words upon which a subject line is based. In particular, in some embodiments, a subject line keyword includes one or more words (e.g., keywords) to be used in generating a subject line. In some cases, a subject line keyword includes one or more words to be explicitly recited in a subject line. In some instances, a subject line keyword is associated with a topic or concept to be included in a subject line. Indeed, in some cases, the subject line generation system 106 generates a subject line that conveys a topic or concept associated with a subject line keyword without explicitly reciting the subject line keyword.

As illustrated, in FIG. 2, the subject line generation system 106 receives multiple subject line keywords. In some instances, however, the subject line generation system 106 receives one subject line keyword. Further, in some implementations, the subject line generation system 106 receives no subject line keywords. Indeed, in some instances, the subject line generation system 106 receives a request to generate a subject line without receiving a subject line keyword. Thus, in some embodiments, the subject line generation system 106 generates a subject line without the use of a subject line keyword.

As indicated by FIG. 2, the subject line generation system 106 generates a subject line 206 from the subject line keywords 204a-204b. In particular, the subject line generation system 106 generates the subject line 206 utilizing a subject generation machine-learning model 208. Indeed, in one or more embodiments, the subject line generation system 106 utilizes the subject generation machine-learning model 208 to analyze the subject line keywords 204a-204b and generate the subject line 206 based on the analysis.

In one or more embodiments, a machine learning-model includes a computer representation that can be tuned (e.g., trained) based on inputs to approximate unknown functions. In particular, in some embodiments, a machine learning-model includes a model that utilizes algorithms to learn from, and make predictions on, known data by analyzing the known data to learn to generate outputs that reflect patterns and attributes of the known data. For instance, in some instances, a machine learning-model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, a subject generation machine-learning model includes a machine-learning model that generates subject lines. In particular, in some embodiments, a subject generation machine-learning model includes a machine-learning model that generates a subject line using one or more subject line keywords or without the use of subject line keywords. In some cases, a subject generation machine-learning model includes a neural network. For instance, as will be discussed in more detail below, in some implementations, a subject generation machine-learning model includes a neural network having parameters determined using one or more other machine-learning models.

As further shown in FIG. 2, the subject line generation system 106 provides the subject line 206 for display on the client device 202. In some cases, the subject line generation system 106 generates a plurality of subject lines from the subject line keywords 204a-204b and provides the plurality of subject lines for display. Further, the subject line generation system 106 receives a selection of one of the subject lines. For example, in some cases, the subject line generation system 106 receives a selection of a subject line for use in conjunction with a communication or another body of text.

While the discussion herein focuses on generating subject lines from subject line keywords, it should be understood that the subject line generation system 106 can provide various outputs. In particular, the subject line generation system 106 generates various text-based inputs in various embodiments. For instance, in some cases, the subject line generation system 106 receives one or more keywords or some other input, such as a title, from a client device and utilizes the subject generation machine-learning model 208 to generate a paragraph or an article. Thus, in some cases, the subject line generation system 106 trains and implements the subject generation machine-learning model 208 to generate a large set of text from a relatively shorter set of text.

Figure 3:
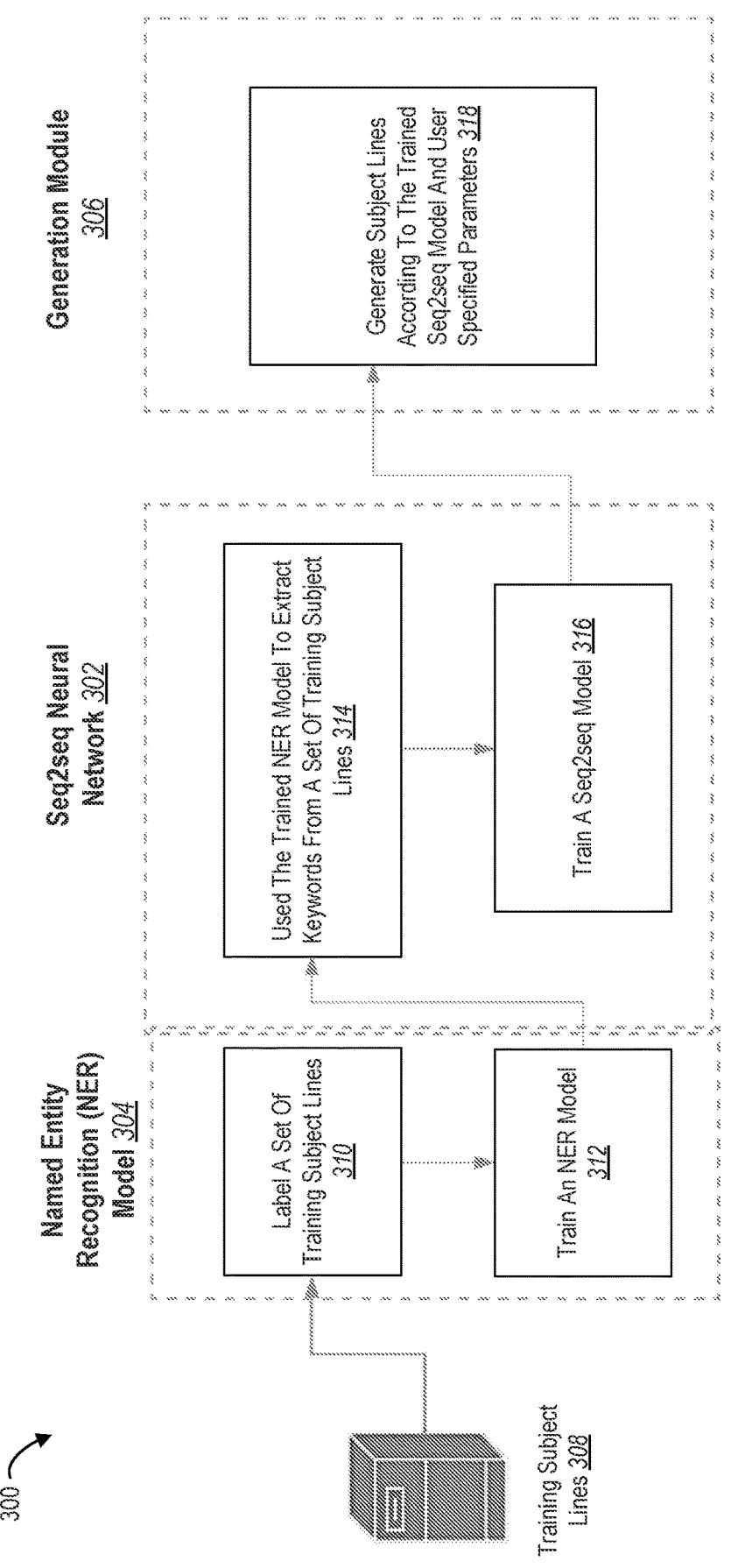
FIG. 3 illustrates a diagram for utilizing an artificial intelligence framework to implement machine learning for subject line generation in accordance with one or more embodiments.

As mentioned above, in one or more embodiments, the subject line generation system 106 utilizes an artificial intelligence framework that includes one or more machine-learning models to generate a subject line from one or more subject line keywords. In particular, in some embodiments, the subject line generation system 106 utilizes an artificial intelligence framework to train and/or implement a subject generation machine-learning model for generating subject lines. FIG. 3 illustrates a diagram for implementing an artificial intelligence framework 300 in accordance with one or more embodiments.

In particular, as shown in FIG. 3, the artificial intelligence framework 300 includes a sequence-to-sequence neural network 302. Indeed, in some implementations, the subject line generation system 106 utilizes, as the subject generation machine-learning model for generating subject lines, the sequence-to-sequence neural network 302.

In one or more embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In some implementations, the sequence-to-sequence neural network 302 includes an encoder-decoder architecture. In some instances, the encoder and/or the decoder of the sequence-to-sequence neural network 302 include one or more transformer layers. In some cases, the sequence-to-sequence neural network 302 includes the sequence-to-sequence neural network architecture described in U.S. patent application Ser. No. 16/678,378, filed on Nov. 8, 2019, entitled TRANSLATING TEXTS FOR VIDEOS BASED ON VIDEO CONTENT, which is incorporated herein by reference in its entirety. In some embodiments, the sequence-to-sequence neural network 302 includes the architecture described by Sascha Rothe et al., *Leveraging Pre-trained Checkpoints for Sequence Generation Tasks*, Transactions of the Association for Computational Linguistics 8, 264-280, 2020, which is incorporated herein by reference in its entirety.

As further shown in FIG. 3, the artificial intelligence framework 300 includes a named entity recognition model 304 and a generation module 306. In particular, as will be explained, the subject line generation system 106 utilizes the named entity recognition model 304 to facilitate training of (e.g., prepare training data for) the sequence-to-sequence neural network 302 and utilizes the generation module 306 in implementing the sequence-to-sequence neural network 302. In other words, in some cases, the generation module 306 is not a separate model; rather, it is the implementation of the sequence-to-sequence neural network 302.

In one or more embodiments, the named entity recognition model 304 includes a bi-directional encoder representations from transformers (BERT) model. In particular, in some embodiments, the named entity recognition model 304 includes a BERT model with a token classification head on top (e.g., a linear layer on top of the hidden states output). In some implementations, the named entity recognition model 304 includes one of the BERT models described in U.S. Pat. No. 11,322,133, filed on Jul. 21, 2020, entitled EXPRESSIVE TEXT-TO-SPEECH UTILIZING CONTEXTUAL WORD-LEVEL STYLE TOKENS or U.S. patent application Ser. No. 17/657,477, filed Mar. 31, 2022, entitled GENERATING PERSONALIZED IN-APPLICATION RECOMMENDATIONS UTILIZING IN-APPLICATION BEHAVIOR AND INTENT, both of which are incorporated herein by reference in their entirety.

As mentioned, and as shown in FIG. 3, the subject line generation system 106 utilizes the artificial intelligence framework 300 to determine parameters for the sequence-to-sequence neural network 302. In particular, in some cases, the subject line generation system 106 utilizes the named entity recognition model 304 of the artificial intelligence framework 300 to determine the parameters.

To illustrate, as shown in FIG. 3, the subject line generation system 106 accesses training subject lines 308 for determining the parameters of the sequence-to-sequence neural network 302. In some cases, the training subject lines 308 include lines of text. In some cases, the training subject lines 308 include combinations of text and one or more additional elements, such as graphical elements. In some embodiments, the training subject lines 308 include other useful features, such as subject lines having no particular associated keywords so that sequence-to-sequence neural network 302 learns to generate subject lines without the user of subject line keywords. As indicated, in some instances, the subject line generation system 106 stores the training subject lines 308 in a server or other storage location and accesses the training subject lines 308 to train the sequence-to-sequence neural network 302.

As shown in FIG. 3, the subject line generation system 106 performs an act 310 of labeling a set of training subject lines (or receiving a labeled set of training data). In some implementations, the subject line generation system 106 labels the set of training subject lines by associating each included training subject line with one or more labels. To illustrate, in some implementations, the subject line generation system 106 associates each word in a training subject line with a corresponding label.

In some cases, the subject line generation system 106 utilizes a pre-determined set of labels in labeling the set of training subject lines. As one example, the subject line generation system 106 utilizes a pre-determined set consisting of labels for "holiday," "deal," "time," "product," or "null." It should be understood, however, that the number and content of the pre-determined set of labels can vary in various embodiments to accommodate different needs for the subject lines that will be generated at inference time. More detail regarding labeling training subject lines will be provided below with reference to FIG. 4.

As illustrated by FIG. 3, the subject line generation system 106 further performs an act 312 of training (e.g., determining parameters for) the named entity recognition model 304. In particular, in some embodiments, the subject line generation system 106 trains the named entity recognition model 304 utilizing the labeled set of training subject lines. To illustrate, in some implementations, the subject line generation system 106 provides a training subject line (e.g., without the labels) to the named entity recognition model 304. Additionally, the subject line generation system 106 utilizes the named entity recognition model 304 to extract keywords from the training subject line. In other words, the subject line generation system 106 utilizes the named entity recognition model 304 to predict which words from the training subject line are keywords. In some cases, the subject line generation system 106 compares the extracted keywords with the labels (e.g., as ground truth) associated with that training subject line and modifies the parameters of the named entity recognition model 304 based on the comparison. For instance, in at least one implementation, the subject line generation system 106 compares the extracted keywords with the corresponding labels via a loss function and modifies the parameters of the named entity recognition model 304 based on the determined loss. In some cases, the subject line generation system 106 modifies the parameters of the named entity recognition model 304 via multiple training iterations.

Additionally, as shown in FIG. 3, the subject line generation system 106 performs an act 314 of using the named entity recognition model 304 to extract training subject line keywords from a set of training subject lines. To illustrate, in one or more embodiments, the subject line generation system 106 utilizes the named entity recognition model 304 to extract one or more training subject line keywords from each included training subject line. The set of training subject lines from which the training subject line keywords are extracted can be the same set of training subject lines that were labeled for training the named entity recognition model 304 or a different set of training subject lines.

Further, as shown in FIG. 3, the subject line generation system 106 performs an act 316 of training (e.g., determining parameters for) the sequence-to-sequence neural network 302. In particular, in some embodiments, the subject line generation system 106 trains the sequence-to-sequence neural network 302 utilizing the training subject line keywords extracted via the named entity recognition model 304. To illustrate, in some implementations, the subject line generation system 106 provides a concatenated set of training subject line keywords to the sequence-to-sequence neural network 302 (e.g., a concatenation of the one or more keywords extracted from the same training subject line). Additionally, the subject line generation system 106 utilizes the sequence-to-sequence neural network 302 to generate a predicted subject line from the set of training subject line keywords. In some cases, the subject line generation system 106 compares the predicted subject line with the training subject line from which the set of training subject line keywords was extracted and modifies the parameters of the sequence-to-sequence neural network 302 based on the comparison. For instance, in at least one implementation, the subject line generation system 106 compares the predicted subject line with the corresponding training subject line via a loss function and modifies the parameters of the sequence-to-sequence neural network 302 based on the determined loss. In some cases, the subject line generation system 106 modifies the parameters of the sequence-to-sequence neural network 302 via multiple training iterations.

In some cases, the subject line generation system 106 concatenates the training subject line keywords in an order based on their associated keyword category. For instance, in some cases, when using the "holiday," "deal," "time," "product," keyword categories, the subject line generation system 106 concatenates the training subject line keywords in the following order: time, product, holiday, and deal. It should be understood, however, that the subject line generation system 106 utilizes different orderings (or no particular ordering at all) in various embodiments. It should further be understood that, in some implementations, the subject line generation system 106 can receive subject line keywords in various orders at inference time despite the ordering of training subject line keywords utilized during training.

In some instances, the subject line generation system 106 utilizes the sequence-to-sequence neural network 302 to generate a predicted subject line with no training subject line keywords. Indeed, in some cases the subject line generation system 106 determines parameters for the sequence-to-sequence neural network 302 that facilitate the generation of subject lines without any subject line keywords acting as a basis. Thus, in some implementations, the subject line generation system 106 utilizes the sequence-to-sequence neural network 302 to generate predicted subject lines without training subject line keywords and modifies its parameters based on a comparison with the predicted subject lines and their corresponding ground truths.

Additionally, as shown in FIG. 3, the subject line generation system 106 performs an act 318 of utilizing the sequence-to-sequence neural network 302 with the determined parameters to generate subject lines. In particular, the subject line generation system 106 receives subject line keywords (and other values, discussed more below) and utilizes the sequence-to-sequence neural network 302 with the determined parameters to generate subject lines accordingly. Thus, in one or more embodiments, the subject line generation system 106 implements the artificial intelligence framework 300 to train and implement the sequence-to-sequence neural network 302 to generate subject lines from subject line keywords.

In one or more embodiments, the subject line generation system 106 utilizes the sequence-to-sequence neural network 302 to generate a subject line by determining that the probability distribution of a word sequence can be decomposed into the product of conditional next word distributions as follows:

$$P(w_{1:T}|W_0) = \prod_{t=1}^{T} P(w_t|w_{1:t-1}, W_0), \text{ with } w_{1:0} = \emptyset \quad (1)$$

In function 1, $W_0$ represents the subject line keywords that are input into the sequence-to-sequence neural network 302. Further, in function 1, T represents the length of the word sequence. In some cases, the subject line generation system 106 determines the length of T on the fly as follows:

$$T = t \text{ such that } EOS \text{ token is generated from } P(w_t|w_{1:t-1}, W_0) \quad (2)$$

In function 2, EOS refers to a token representing the end of a sentence. In one or more embodiments, the subject line generation system 106 choses the word associated with the highest probability (e.g., via a greedy search algorithm) as follows:

$$w_t = \text{argmax}_w P(w|w_{1:t-1}) \quad (3)$$

In some implementations, however, the subject line generation system 106 adds a degree of randomness to the word selection by simulating a word from the conditional next word distribution as follows:

$$w_t \sim P(w|w_{1:t-1}) \quad (4)$$

By simulating the word from the conditional next word distribution via function 4, the subject line generation system 106 increases the diversity of the subject lines generated using the sequence-to-sequence neural network 302 rather than generating the same subject line in response to different requests. Indeed, in some cases, the subject line generation system 106 generates multiple varies subject lines as candidates and facilitates a selection of a preferred subject line. Further, the subject line generation system 106 more closely simulates high quality human language (e.g., by smoothing the probability distribution in function 4), which typically does not follow a distribution of high probability of next words. Thus, the subject lines generated will be more varied and less predictable.

By utilizing a subject generation machine-learning model (e.g., the sequence-to-sequence neural network 302) to generate subject lines, the subject line generation system 106 provides improved flexibility when compared to conventional systems. Indeed, the subject line generation system 106 flexibly generates subject lines using machine learning parameters rather than the limited pool of pre-determined phrases used by many conventional systems. Thus, the subject line generation system 106 offers a wider variety of subject lines than available under conventional systems.

Further, by determining the parameters of the sequence-to-sequence neural network 302 using the named entity recognition model 304, the subject line generation system 106 operates with improved efficiency when compared to conventional systems. Indeed, as discussed above, many conventional systems implementing deep generation models typically require weeks and a significant amount of computing resources to adequately determine the parameters that facilitate effective text generation. In contrast, in some instances, the subject line generation system 106 requires only a few minutes to train the named entity recognition model 304 and a few hours to determine the parameters for the sequence-to-sequence neural network 302.

Figure 4:
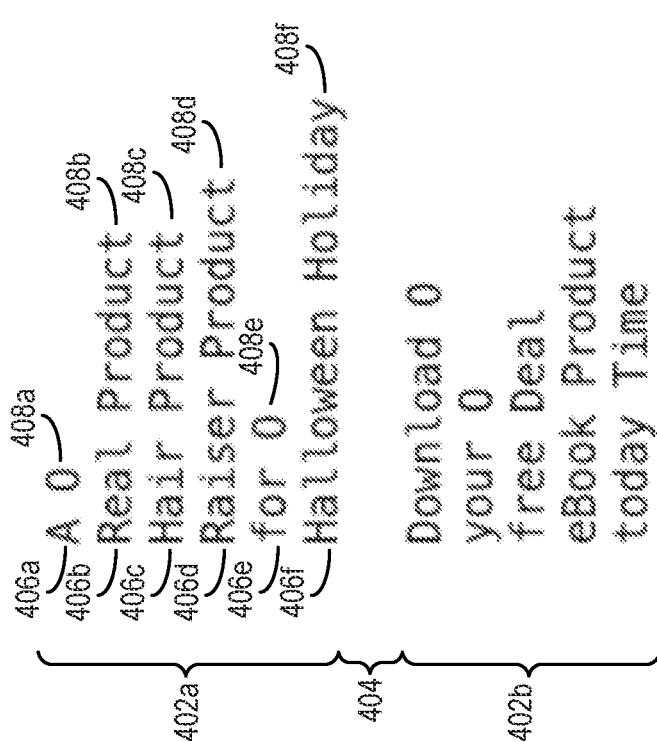
FIG. 4 illustrates training subject lines utilized by the subject line generation system to determine parameters for a named entity recognition model in accordance with one or more embodiments.

FIG. 4 illustrates training subject lines 402*a*-402*b* utilized by the subject line generation system 106 to determine parameters for a named entity recognition model in accordance with one or more embodiments. In particular, FIG. 4 illustrates labeling the training subject lines 402*a*-402*b* for use in determining the parameters of the named entity recognition model.

As shown in FIG. 4, the subject line generation system 106 separates the training subject line 402*a* and the training subject line 402*b* by an empty line 404. For instance, in some cases, the subject line generation system 106 stores the training subject lines to be used within the same file or document and separates each training subject line by an empty line. In some implementations, however, the subject line generation system 106 stores each training subject line to be used within a separate file or document. Thus, the subject line generation system 106 provides the plurality of files or documents to the named entity recognition model for determining its parameters.

As further shown in FIG. 4, the subject line generation system 106 associates labels with the words from the training subject lines 402*a*-402*b*. To illustrate, the training subject line 402*a* includes the words 406*a*-406*f* (or tokens) in a first column. Accordingly, the subject line generation system 106 associates the words 406*a*-406*f* with the labels 408*a*-408*f* shown in the second column. In particular, the subject line generation system 106 associates each of the words 406*a*-406*f* with a label.

As mentioned above, and as illustrated in FIG. 4, the subject line generation system 106 associates the words with a label from a pre-determined set consisting of labels for "holiday," "deal," "time," "product," or "null," thought additional, fewer, or different labels can be used in various embodiments. In some cases, the subject line generation system 106 utilizes a "null" label to indicate that the associated word does not correspond to one of the other labels in the pre-determined set. For instance, in some cases, the subject line generation system 106 populates the pre-determined set with labels for keyword categories that are to be considered when using the named entity recognition model to extract keywords from training subject lines and further includes the "null" label for words that do not correspond to one of those keyword categories.

Thus, in one or more embodiments, the subject line generation system 106 labels training subject lines as shown in FIG. 4. The subject line generation system 106 further utilizes the labeled training subject lines to determine parameters for a named entity recognition model as described above with reference to FIG. 3.

FIG. 5 illustrates a table reflecting experimental results regarding the effectiveness of the named entity recognition model utilized by the subject line generation system 106 in accordance with one or more embodiments. In particular, the table of FIG. 5 reflects the performance of the named entity recognition model in extracting, from training subject lines, keywords associated with the "holiday," "deal," "time," and "product" labels. As further shown in FIG. 5, the table measures the performance of the named entity recognition model using precision, recall, and f1-score metrics. The table further provides the support metric, which indicates the number of samples of the true response included in each keyword category. As indicated by FIG. 5, the named entity recognition model provides high values for each of the included metrics.

FIG. 6 illustrates training subject line keywords utilized by the subject line generation system 106 to determine parameters for a subject generation machine-learning model (e.g., a sequence-to-sequence neural network) in accordance with one or more embodiments. Indeed, FIG. 6 illustrates a first set of training subject line keywords 602*a* and a second set of training subject line keywords 602*b*. In one or more embodiments, the subject line generation system 106 extracts the first set of training subject line keywords 602*a* and the second set of training subject line keywords 602*b* from corresponding training subject lines. For instance, in some cases, the subject line generation system 106 utilizes a trained named entity recognition model to extract the first set of training subject line keywords 602*a* and the second set of training subject line keywords 602*b* from corresponding training subject lines as discussed above with reference to FIG. 3. In some implementations, the subject line generation system 106 further orders the extracted training subject line keywords as described above (e.g., time, product, holiday, and deal).

As further shown in FIG. 6, the subject line generation system 106 generates a first predicted subject line 604*a* and a second predicted subject line 604*b* from the first set of training subject line keywords 602*a* and the second set of training subject line keywords 602*b*, respectively. In particular, in one or more embodiments, the subject line generation system 106 utilizes a subject generation machine-learning model (e.g., a sequence-to-sequence neural network) to generate the first predicted subject line 604*a* and the second predicted subject line 604*b*. In some cases, the first predicted subject line 604*a* and the second predicted subject line 604*b* correspond to the training subject lines from which the first set of training subject line keywords 602*a* and the second set of training subject line keywords 602*b* are extracted. In other words, the subject line generation system 106 extracts the first set of training subject line keywords 602*a* and the second set of training subject line keywords 602*b* from training subject lines having the same content. Thus, in some instances, FIG. 6 also illustrates the preparation of paired training data for use in training the subject generation machine-learning model.

Thus, in one or more embodiments, the subject line generation system 106 utilizes a subject generation machine-learning model to generate predicted subject lines from training subject line keywords as shown in FIG. 6. The subject line generation system 106 further modifies the parameters of the subject generation machine-learning model based on the predictions (e.g., based on comparing the predicted subject lines with the training subject lines from which the training subject line keywords were extracted).

Figure 7:
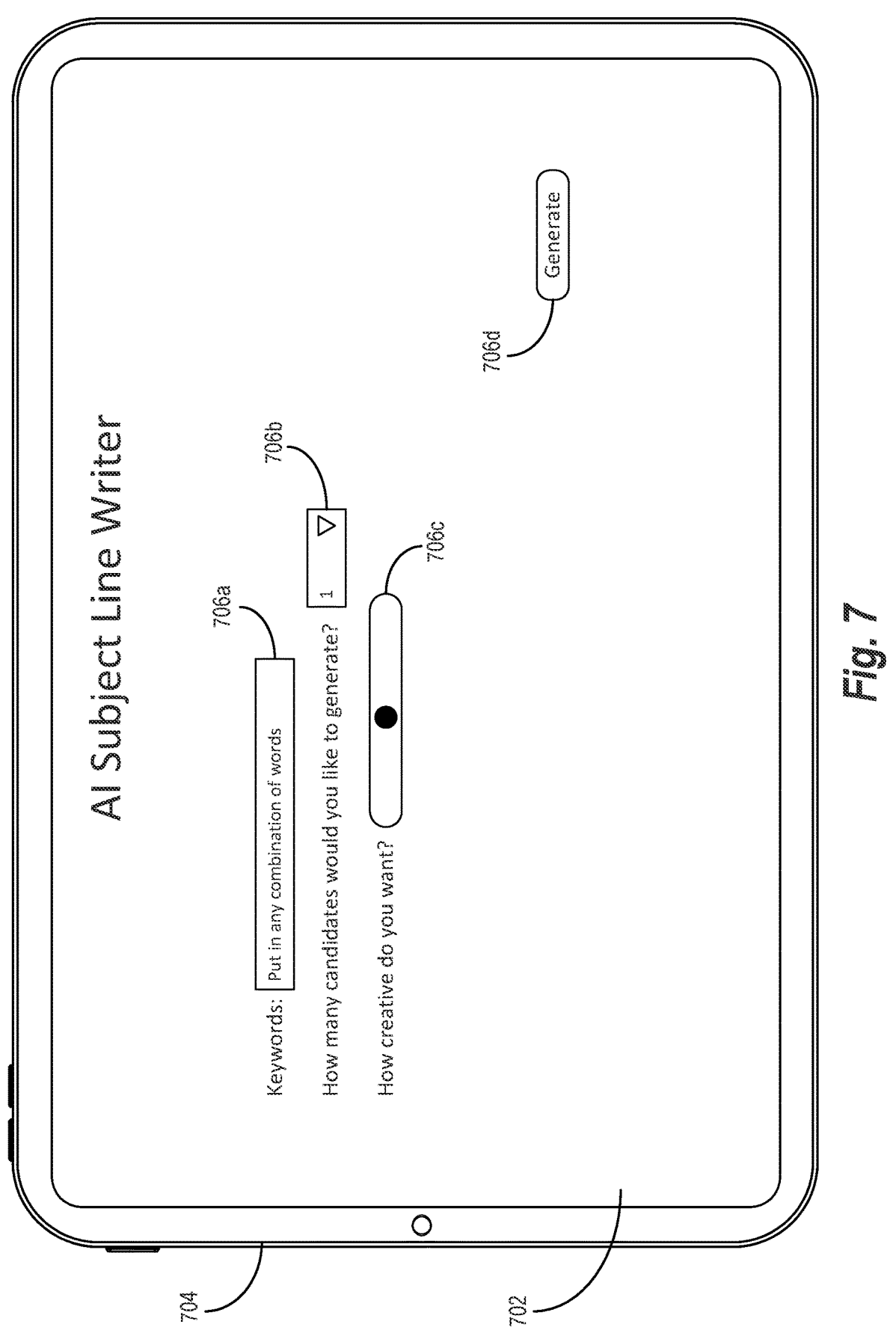
FIG. 7 illustrates a graphical user interface utilized by the subject line generation system to implement a subject generation machine-learning model in accordance with one or more embodiments.

As previously discussed, in some cases, the subject line generation system 106 utilizes a graphical user interface displayed on a client device to implement a subject generation machine-learning model for generating subject lines from subject line keywords. FIG. 7 illustrates a graphical user interface utilized by the subject line generation system 106 to implement a subject generation machine-learning model in accordance with one or more embodiments.

Indeed, as shown in FIG. 7, the subject line generation system 106 provides a graphical user interface 702 for display on a client device 704. As further shown in FIG. 7, the subject line generation system 106 provides a plurality of interactive elements 706*a*-706*d* for display within the graphical user interface 702. For example, the subject line generation system 106 provides the interactive element 706*a* (i.e., a text box) for entering in one or more subject line keywords. Thus, in some embodiments, the subject line generation system 106 receives one or more subject line keywords for generating a subject line via the interactive element 706*a*.

In some cases, the subject line generation system 106 utilizes the interactive elements 706*b*-706*d* for receiving additional input for use in generating a subject line. For instance, in some embodiments, the subject line generation system 106 utilizes the interactive element 706*b* for receiving a number of subject lines to generate using the subject line keywords received via the interactive element 706*a*. Thus, in some cases, the subject line generation system 106 utilizes the subject generation machine-learning model to generate a number of subject lines in accordance with an interaction with the interactive element 706*b*.

In some implementations, the subject line generation system 106 utilizes the interactive element 706*c* to receive a creativity score. In one or more embodiments, a creativity score includes a value for controlling the information included in a generated subject line. In particular, in some embodiments, a creativity score includes a value that corresponds to the process of selecting a word to be included in a generated subject line. For instance, in some cases, the subject line generation system 106 utilizes a creativity score to sharpen or smoothen the conditional next word distributions discussed above with reference to FIG. 3. For instance, in some embodiments, the subject line generation system 106 selects words by dividing the original scores of each token used in calculating softmax by a "temperature" parameter of the subject generation machine-learning model. In some instances, the higher the value of the "temperature" parameter, the more likely the token with relatively low score will be selected. In some cases, the subject line generation system 106 utilizes the following where t represents the "temperature" parameter:

$$P(\text{token}_i) = \frac{e^{\frac{(score_i)}{t}}}{\sum_{j=1}^{3000} e^{\frac{(score_j)}{t}}} = \frac{(e^{score_i})^{1/t}}{\sum_{j=1}^{3000} e^{\frac{(score_j)}{t}}} \quad (5)$$

According to function 5, t>1 corresponds to a smoother distribution while t<1 corresponds to a sharper distribution.

Thus, in some embodiments, the subject line generation system 106 determines the value of the "temperature" parameter via the creativity score received via the interactive element 706*c*. In some cases, the subject line generation system 106 associates the creativity score with a quantity of information to be included in a generated subject line. For instance, in some cases, the subject line generation system 106 adds relatively more information into a subject line where the creativity score is relatively higher.

In one or more embodiments, the subject line generation system 106 utilizes the interactive element 706*d* for receiving a request to generate a subject line. In particular, in some cases, the subject line generation system 106 receives a request to generate at least one subject line using the values received via the interactive elements 706*a*-706*c*. Thus, upon detecting an interaction with the interactive element, the subject line generation system 106 implements the subject generation machine-learning model to generate one or more subject lines. In some cases, as will be shown below, the subject line generation system 106 further provides the generated subject line(s) for display within the graphical user interface 702.

Figure 8:
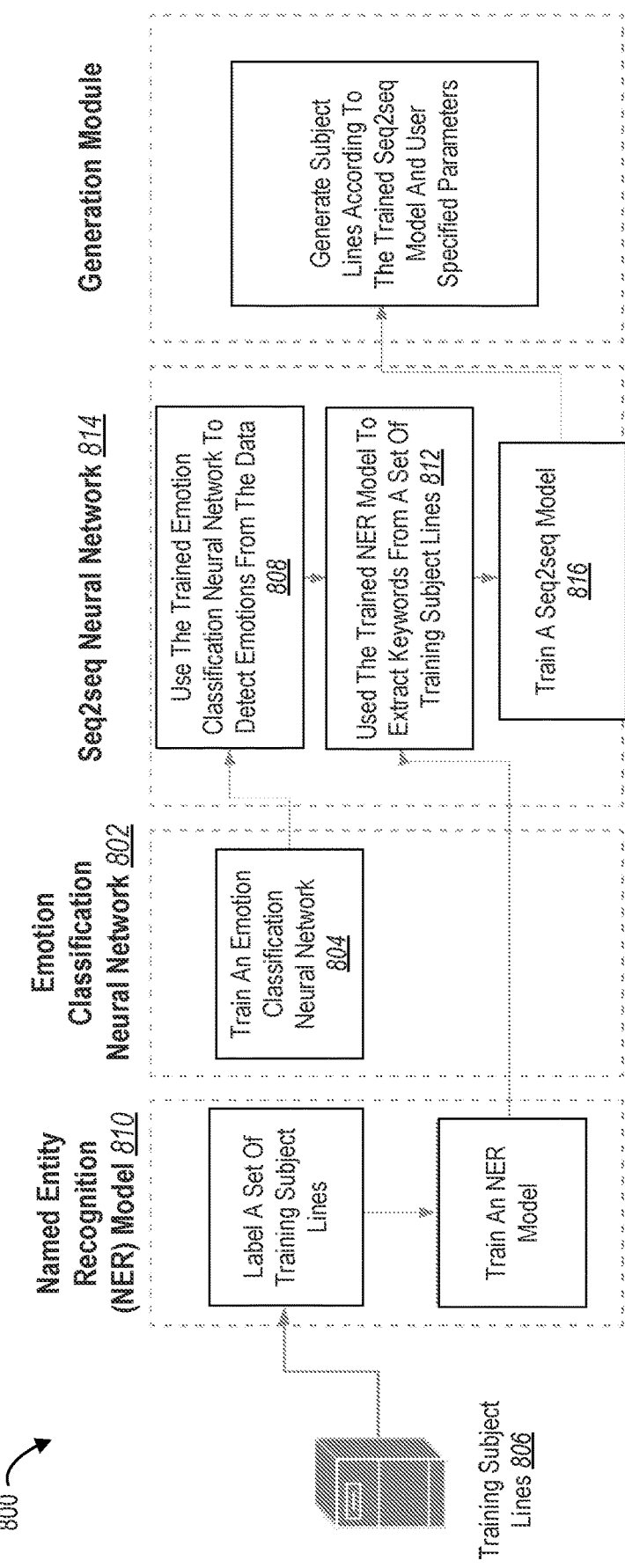
FIG. 8 illustrates a diagram for implementing an artificial intelligence framework that includes an emotion classification neural network in accordance with one or more embodiments.

As previously discussed, in some implementations, the subject line generation system 106 determines parameters for the subject generation machine-learning model that facilitate the generation of subject lines that convey particular emotions. In some embodiments, the subject line generation system 106 incorporates an emotion classification neural network into the artificial intelligence framework used to train and implement the subject generation machine-learning model. FIG. 8 illustrates a diagram for implementing an artificial intelligence framework 800 that includes an emotion classification neural network 802 in accordance with one or more embodiments.

In one or more embodiments, the emotion classification neural network 802 includes a BERT classification model. For instance, in some cases, the emotion classification neural network 802 includes one of the BERT models described in U.S. Pat. No. 11,322,133 or U.S. patent application Ser. No. 17/657,477 discussed above. In some cases, the emotion classification neural network 802 includes one or more transformer layers.

To focus on the differences from the artificial intelligence framework 300 discussed above with reference to FIG. 3, FIG. 8 illustrates that the subject line generation system 106 performs an act 804 of training (e.g., determining parameters for) the emotion classification neural network 802. In some cases, the subject line generation system 106 trains the emotion classification neural network 802 utilizing the training subject lines 806. To illustrate, in some embodiments, the subject line generation system 106 labels a training subject line with one or more emotion classifications. Further, the subject line generation system 106 utilizes the emotion classification neural network 802 to generate one or more predicted emotions from the training subject line. In other words, the subject line generation system 106 provides the training subject line (without the emotion classification label(s)) to the emotion classification neural network 802 and generates one or more predicted emotions accordingly.

Additionally, the subject line generation system 106 compares the predicted emotion(s) to the emotion classification label(s) (e.g., via a loss function) and modifies the parameters of the emotion classification neural network 802 based on the comparison. In some cases, the subject line generation system 106 modifies the parameters of the emotion classification neural network 802 via multiple training iterations. Thus, the subject line generation system 106 trains the emotion classification neural network 802 to detect emotions from subject lines.

As further shown in FIG. 8, the subject line generation system 106 performs an act 808 of using the emotion classification neural network 802 to detect training emotions from training subject lines. For instance, in some cases, the subject line generation system 106 provides a training subject line to the emotion classification neural network 802 and detects one or more training emotions from the training subject line accordingly. The subject line generation system 106 can utilize the same training subject lines or different training subject lines than those used in determining the parameters for the emotion classification neural network 802.

In one or more embodiments, however, the subject line generation system 106 utilizes the same training subject lines from which training subject line keywords are extracted by the named entity recognition model 810 (e.g., via the act 812). Thus, in some cases, the subject line generation system 106 utilizes the detected emotions and the corresponding extracted training line keywords to determine the parameters of the sequence-to-sequence neural network 814 (e.g., via the act 816).

To provide an illustration, in one or more embodiments, the subject line generation system 106 utilizes the emotion classification neural network 802 to detect one or more training emotions from a training subject line. The subject line generation system 106 further utilizes the named entity recognition model 810 to extract one or more training subject line keywords from the same training subject line. The subject line generation system 106 provides the training emotion(s) and the training subject line keyword(s) (e.g., as paired data) to the sequence-to-sequence neural network 814 and generates a predicted subject line accordingly. In particular, the subject line generation system 106 utilizes the sequence-to-sequence neural network 814 to generate a predicted subject line that is based on the training subject line keyword(s) and conveys the training emotion(s). Additionally, the subject line generation system 106 compares the predicted subject line to the training subject line (e.g., via a loss function) and modifies the parameters of the sequence-to-sequence neural network 814 based on the comparison. Thus, in some embodiments, the subject line generation system 106 determines parameters of the sequence-to-sequence neural network 814 that facilitate the generation of subject lines from subject line keywords that also communicate one or more specified emotions.

Figure 9:
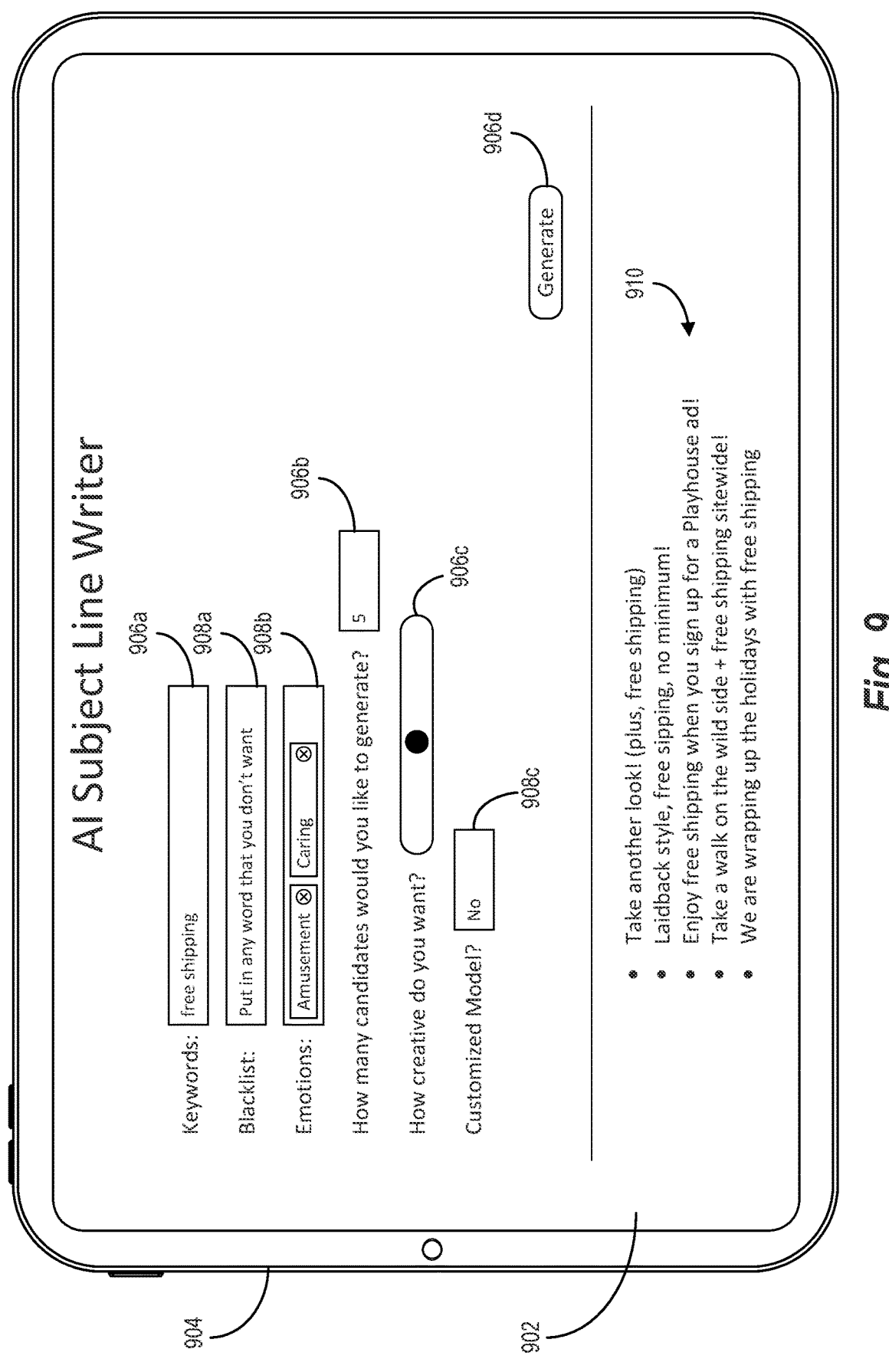
FIG. 9 illustrates another graphical user interface utilized by the subject line generation system to implement a subject generation machine-learning model in accordance with one or more embodiments.

FIG. 9 illustrates another graphical user interface utilized by the subject line generation system 106 to implement a subject generation machine-learning model in accordance with one or more embodiments. Indeed, as shown in FIG. 9, the subject line generation system 106 provides a graphical user interface 902 for display on a client device 904. As further shown in FIG. 9, the subject line generation system 106 provides, for display within the graphical user interface 902, a plurality of interactive active elements 906a-906d (e.g., those discussed above with reference to FIG. 7) for receiving input for use in generating a subject line. Additionally, the subject line generation system 106 provides, for display within the graphical user interface 902, additional interactive elements 908a-908c for receiving additional input for use in generating a subject line.

To illustrate, as indicated by FIG. 9, the subject line generation system 106 utilizes the interactive element 908a for receiving a blacklist. In one or more embodiments, a blacklist includes a list of one or more words to omit from a subject line. Indeed, in some embodiments, the subject line generation system 106 omits a word from a generated subject line if the word appears within a submitted blacklist. For instance, in some cases, the subject line generation system 106 utilizes the subject generation machine-learning model to generate each word from the conditional next word distribution as described above unless the word is included in the blacklist. In some implementations, the subject line generation system 106 omits the word even if it is submitted as a subject line keyword. Thus, in some cases, the subject line generation system 106 utilizes the subject generation machine-learning model to generate a subject line in accordance with words submitted via the interactive element 908a.

In some cases, the subject line generation system 106 utilizes the interactive element 908b to receive one or more emotion indicators. In one or more embodiments, an emotion indicator includes reference to an emotion. For instance, in some embodiments, an emotion indicator includes a word or phrase that specifies an emotion. FIG. 9 illustrates the interactive element 908b as a text box. In some cases, the interactive element 908b includes a drop-down menu or other type of element that facilitates selections from among a set of predetermined emotion indicators. Thus, in some cases, the subject line generation system 106 utilizes the subject generation machine-learning model to generate a subject line that conveys one or more emotion indicators (e.g., emotions associated with the emotion indicators) submitted via the interactive element 908b.

In some implementations, the subject line generation system 106 utilizes the interactive element 908c to determine whether to implement a customized subject generation machine-learning model. Indeed, in some cases, the subject line generation system 106 trains and implements a subject generation machine-learning model that is customized for a particular client device. In particular, in some embodiments, the subject line generation system 106 trains the subject generation machine-learning model using a customized set of training data that provides insight into the products, culture, and/or writing style that is unique to the client device.

To provide an illustration, in some implementations, the subject line generation system 106 trains the subject generation machine-learning model as described above with reference to FIGS. 3 and 7 utilizing a large, generic set of training data. The subject line generation system 106 further retrains the subject generation machine-learning model utilizing a relatively smaller set of customized training data. The subject line generation system 106 utilizes the retraining process to fine tune the parameters of the subject generation machine-learning model for facilitating the generation of subject lines that accommodate the custom products, culture, and/or writing style of a particular client device. Thus, the subject line generation system 106 offers additional flexibility with regard to the generation of subject lines. In some cases, the subject line generation system 106 retrains the subject generation machine-learning model in a matter of seconds, offering improved flexibility without a significant increase in training time and resources.

Thus, in some cases, upon determining to implement a customized subject generation machine-learning model via an interaction with the interactive element 908c, the subject line generation system 106 implements a subject generation machine-learning model that has been retrained on a set of training data that has been customized for the client device 904. For instance, in embodiments, the subject line generation system 106 receives one or more subject line keywords that are unique to the client device 904 or carry a unique meaning when associated with the client device 904. The subject line generation system 106 further utilizes the customized subject generation machine-learning model to generate one or more subject lines that convey the meaning of such subject line keywords.

Thus, the subject line generation system 106 utilizes interactions with at least one of the interactive elements 906a-906d and the interactive elements 908a-908c to generate one or more subject lines. Indeed, as previously mentioned, the subject line generation system 106 generates a plurality of subject lines in some instances. As shown in FIG. 9, the subject line generation system 106 further provides the generated subject lines 910 for display within the graphical user interface 902.

FIGS. 10A-10I each illustrate a table reflecting one or more subject lines generated by the subject line generation system 106 using various received values in accordance with one or more embodiments. For example, the table of FIG. 10A illustrates subject lines generated based on different creativity scores. As shown, the subject lines generated based on the higher creativity score include more information than those generated using the lower creativity score. Indeed, in some cases, with a higher creativity score, the subject line generation system 106 adds more information that is not included in the submitted subject line keywords, such as the phrases "shop for her," "keep calm," and "open for a discount."

The table of FIG. 10B illustrates that the subject line generation system 106 can generate subject lines without restrictions on the order of the subject line keywords that are received. Indeed, as previously mentioned, the subject line generation system 106 determines parameters for the subject generation machine learning model using a particular order of training subject line keywords but can receive subject line keywords in varying orders at inference time. Thus, the subject line generation system 106 offers flexibility with how subject line keywords are submitted.

The table of FIG. 10C illustrates that the subject generation machine-learning model coherent subject lines based on the meaning of the subject line keywords that are received. For instance, the table shows that the subject generation machine-learning model understands that the subject line keyword "sectionals" refers to furniture and generates subject lines accordingly. Further, the table of FIG. 10C illustrates that the subject line generation system 106 generates subject lines that include a combination of text and a graphical element in some cases. In one or more embodiments, a graphical element includes a visual element other than text. For instance, in some cases, a graphical element includes an image element, such as an emoji or picture.

The table of FIGS. 10D-10F provide additional examples of the subject generation machine-learning model understanding the meaning of received subject line keywords and/or the context in which those subject line keywords could apply. Indeed, in some cases, the subject generation machine-learning model implemented by the subject line generation system 106 learns, via the training process, different contexts (e.g., events or seasons) that are associated with different subject line keywords and generates a subject line that corresponds to at least one of those contexts. Accordingly, the subject line generation system 106 generates subject lines with appropriate language for the meanings/context.

The table of FIG. 10G illustrates that the subject line generation system 106 utilizes the subject generation machine-learning model to generate subject lines even where no subject line keyword has been received. Indeed, in some cases, the subject line generation system 106 receives a request to generate a subject line (e.g., via the interactive element 706d discussed above with reference to FIG. 7) without receiving a subject line keyword. Despite the lack of a subject line keyword, however, the subject line generation system 106 can still utilize the subject generation machine-learning model to generate and provide one or more subject lines in response to the request.

The table of FIG. 10H illustrates subject lines generated in accordance with a received blacklist. In particular, the table of FIG. 10H illustrates subject lines generated when the term "necklace" is received as a subject line keyword and as part of the blacklist. The subject line generation system 106 omits the term "necklace" from the generated subject lines but understands the term "necklace" is associated with a particular topic (i.e., jewelry) and generates subject lines that incorporate that topic.

The table of FIG. 10I illustrates subject lines generated utilizing a customized subject generation machine-learning model. In particular, the table compares subject lines generated with and without the customization. As illustrated, the subject line keyword includes a term that may have a unique meaning when associated with a particular client device (e.g., the name of a product associated with the client device). When using the subject generation machine-learning model without customization, the generated subject lines are generic and/or do not completely capture the unique meaning of the subject line keyword. Upon using the customized subject generation machine-learning model, however, the generated subject lines are more specific and more fully capture its unique meaning.

Figure 11:
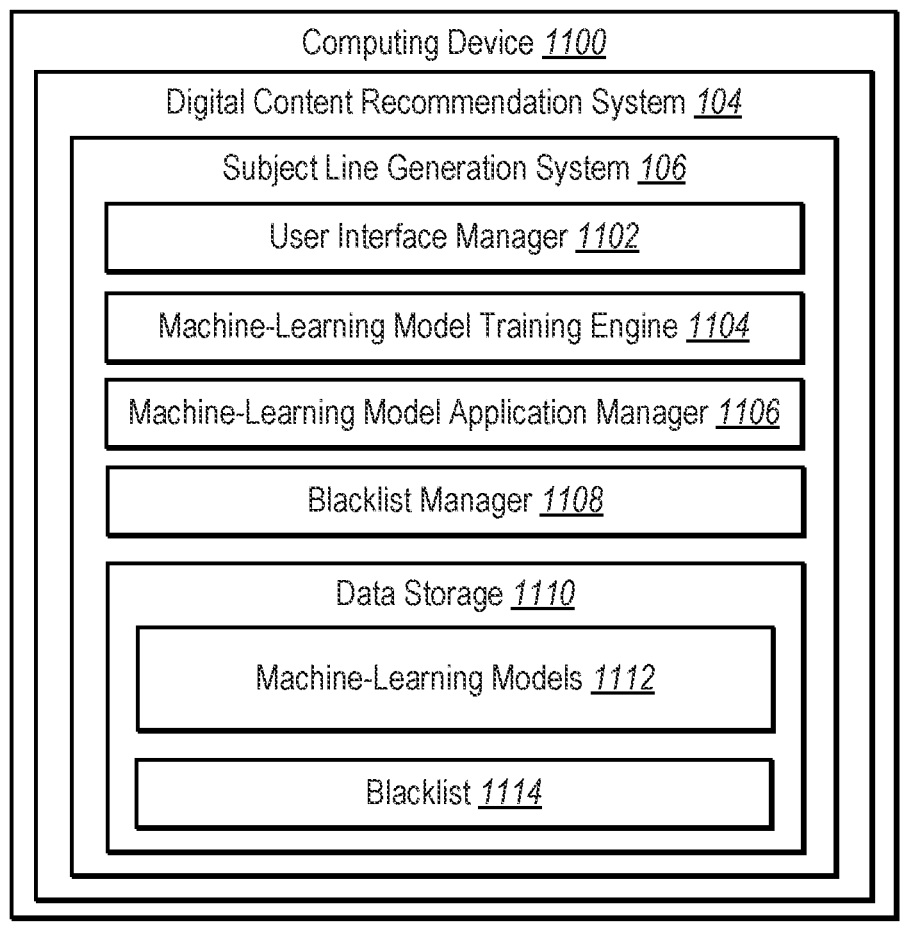
FIG. 11 illustrates an example schematic diagram of a subject line generation system in accordance with one or more embodiments.

Turning now to FIG. 11, additional detail will now be provided regarding various components and capabilities of the subject line generation system 106. In particular, FIG. 11 illustrates the subject line generation system 106 implemented by the computing device 1100 (e.g., the server(s) 102 and/or one of the client devices 110a-110n discussed above with reference to FIG. 1). Additionally, the subject line generation system 106 is also part of the digital content recommendation system 104. As shown in FIG. 11, the subject line generation system 106 includes, but is not limited to, a user interface manager 1102, a machine-learning model training engine 1104, a machine-learning model application manager 1106, a blacklist manager 1108, and data storage 1110 (which includes machine-learning models 1112 and a blacklist 1114).

As just mentioned, and as illustrated in FIG. 11, the subject line generation system 106 includes the user interface manager 1102. In one or more embodiments, the user interface manager 1102 provides a graphical user interface for display on client devices and receives interactions with the graphical user interface. In particular, in some cases, the user interface manager 1102 provides a plurality of interactive elements for display within the graphical user interface and receives input via the interactive elements. In some cases, based on the received input, the user interface manager 1102 determines various values for use in generating subject lines (e.g., keywords to use or number of subject lines to generate).

Additionally, as shown in FIG. 11, the subject line generation system 106 includes the machine-learning model training engine 1104. In one or more embodiments, the machine-learning model training engine 1104 determines parameters for a subject generation machine-learning model that facilitate the generation of subject lines. For instance, in some cases, the machine-learning model training engine 1104 implements an artificial intelligence framework that includes one or more additional machine-learning models, such as a named entity recognition model and/or an emotion classification neural network. The machine-learning model training engine 1104 utilizes the one or more additional machine-learning models to generate training input for the subject generation machine-learning model used in determining its parameters. In some cases, the machine-learning model training engine 1104 further adjusts the parameters of the subject generation machine-learning model using a customized set of training data to facilitate the generation of subject lines from custom subject line keywords.

Further, as shown in FIG. 11, the subject line generation system 106 includes the machine-learning model application manager 1106. In one or more embodiments, the machine-learning model application manager 1106 utilizes the subject generation machine-learning model to generate subject lines from subject line keywords. In some cases, the machine-learning model application manager 1106 utilizes the subject generation machine-learning model based on other received input, such as a creativity score, a blacklist, or one or more emotion indicators.

As shown in FIG. 11, the subject line generation system 106 also includes the blacklist manager 1108. In one or more instances, the blacklist manager 1108 receives and maintains words to omit from generated subject lines. In some cases, the communicates with the machine-learning model application manager 1106 to prevent the inclusion of blacklist words within generated subject lines.

As shown in FIG. 11, the subject line generation system 106 includes data storage 1110. In particular, data storage 1110 includes machine-learning models 1112 and the blacklist 1114. In one or more embodiments, machine-learning models 1112 stores the machine-learning models that facilitate the generation of subject lines from subject line keywords (e.g., the subject generation machine-learning model and the additional machine-learning models used to provide training input). In some embodiments, the blacklist 1114 stores the blacklist of words to omit from generated subject lines.

Each of the components 1102-1114 of the subject line generation system 106 can include software, hardware, or both. For example, the components 1102-1114 can include one or more instructions stored on a computer-readable storage medium and executable by processors of one or more computing devices, such as a client device or server device. When executed by the one or more processors, the computer-executable instructions of the subject line generation system 106 can cause the computing device(s) to perform the methods described herein. Alternatively, the components 1102-1114 can include hardware, such as a special-purpose processing device to perform a certain function or group of functions. Alternatively, the components 1102-1114 of the subject line generation system 106 can include a combination of computer-executable instructions and hardware.

Furthermore, the components 1102-1114 of the subject line generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1114 of the subject line generation system 106 may be implemented as a stand-alone application, such as a desktop or mobile application. Furthermore, the components 1102-1114 of the subject line generation system 106 may be implemented as one or more web-based applications hosted on a remote server. Alternatively, or additionally, the components 1102-1114 of the subject line generation system 106 may be implemented in a suite of mobile device applications or "apps." For example, in one or more embodiments, the subject line generation system 106 can comprise or operate in connection with digital software applications such as ADOBE® CAMPAIGN or ADOBE® SENSEI™. The foregoing are either registered trademarks or trademarks of Adobe Inc. in the United States and/or other countries.

Figure 12:
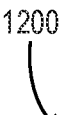
FIG. 12 illustrates a flowchart of a series of acts for utilizing a machine-learning model to generate a subject line from subject line keywords in accordance with one or more embodiments.
Figure 12:
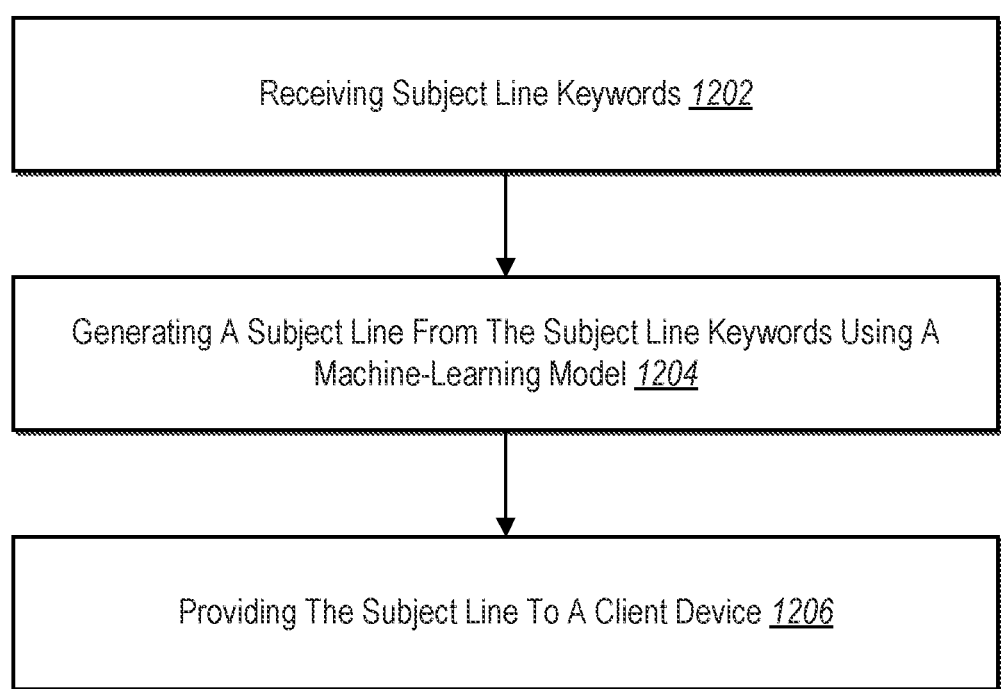

FIGS. 1-11, the corresponding text, and the examples provide a number of different methods, systems, devices, and non-transitory computer-readable media of the subject line generation system 106. In addition to the foregoing, one or more embodiments can also be described in terms of flowcharts comprising acts for accomplishing the particular result, as shown in FIG. 12. FIG. 12 may be performed with more or fewer acts. Further, the acts may be performed in different orders. Additionally, the acts described herein may be repeated or performed in parallel with one another or in parallel with different instances of the same or similar acts.

FIG. 12 illustrates a flowchart of a series of acts 1200 for utilizing a machine-learning model to generate a subject line from subject line keywords in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. Alternatively, a non-transitory computer-readable medium can store executable instructions that, when executed by a processing device, cause the processing device to perform operations comprising the acts of FIG. 12. In some embodiments, a system performs the acts of FIG. 12. For example, in one or more embodiments, a system includes one or more memory components. The system further includes one or more processing devices coupled to the one or more memory components, the one or more processing devices to perform operations comprising the acts of FIG. 12.

The series of acts 1200 includes an act 1202 for receiving subject line keywords. For example, in one or more embodiments, the act 1202 involves receiving, from a client device, one or more subject line keywords. In one or more embodiments, receiving, from the client device, the one or more subject line keywords comprises receiving a custom subject line keyword that is associated with the client device.

The series of acts 1200 also includes an act 1204 for generating a subject line from the subject line keywords using a machine-learning model. For instance, in some embodiments, the act 1204 involves generating, utilizing a subject generation machine-learning model having learned parameters, a subject line by selecting one or more words for the subject line from a word distribution based on the one or more subject line keywords. In some instances, generating, utilizing the subject generation machine-learning model, the subject line from the one or more subject line keywords comprises generating, utilizing the subject generation machine-learning model, a combination of text and at least one graphical element from the one or more subject line keywords.

In one or more embodiments, generating the subject line utilizing the subject generation machine-learning model comprises generating the subject line utilizing a sequence-to-sequence neural network having parameters determined using keywords extracted from text via a named entity recognition model.

In some cases, the subject line generation system 106 receives a creativity score from the client device, the creativity score corresponding to a quantity of information included in the subject line. Accordingly, in some embodiments, generating, utilizing the subject generation machine-learning model, the subject line from the one or more subject line keywords comprises generating, utilizing the subject generation machine-learning model, the subject line from the one or more subject line keywords in accordance with the creativity score. In some implementations, generating, utilizing the subject generation machine-learning model, the subject line from the one or more subject line keywords in accordance with the creativity score comprises: modifying a parameter of the subject generation machine-learning model using the creativity score; and generating the subject line utilizing the subject generation machine-learning model with the modified parameter.

In one or more embodiments, the subject line generation system 106 further receives, from the client device, one or more emotion indicators for the subject line. Accordingly, in some instances, generating, utilizing the subject generation machine-learning model, the subject line from the one or more subject line keywords comprises generating, utilizing the subject generation machine-learning model, at least one subject line that conveys the one or more emotion indicators.

Further, in some cases, the subject line generation system 106 further receives, from the client device, a blacklist including one or more words to omit from the subject line. Thus, in some cases, generating, utilizing the subject generation machine-learning model, the subject line from the one or more subject line keywords comprises generating, utilizing the subject generation machine-learning model, the subject line from the one or more subject line keywords in accordance with the blacklist. In some implementations, receiving the one or more subject line keywords comprises receiving a keyword that is included in the blacklist; and generating, utilizing the subject generation machine-learning model, the subject line from the one or more subject line keywords in accordance with the blacklist comprises generating, utilizing the subject generation machine-learning model, at least one subject line that is based on the one or more subject line keywords and omits the keyword that is included in the blacklist.

As previously mentioned, in some cases, the subject line generation system 106 receives a custom subject line keyword that is associated with the client device. Accordingly, in some embodiments, generating, utilizing the subject generation machine-learning model, the subject line from the one or more subject line keywords comprises generating the subject line from the custom subject line keyword utilizing the subject generation machine-learning model having parameters determined from one or more custom subject line keywords associated with the client device.

Further, the series of acts 1200 includes an act 1206 for providing the subject line to a client device. To illustrate, in some cases, the act 1206 involves providing, for display on the client device (e.g., the client device that submitted the subject line keyword(s)), the subject line.

To provide an illustration, in one or more embodiments, the subject line generation system 106 receives, from a client device, one or more subject line keywords; generates, utilizing a subject generation machine-learning model, a subject line from the one or more subject line keywords; and provides, for display on the client device, the subject line. In some implementations, generating, utilizing the subject generation machine-learning model, the subject line from the one or more subject line keywords comprises generating, utilizing the subject generation machine-learning model, a combination of text and at least one emoji that corresponds to the text from the one or more subject line keywords.

In some cases, the subject line generation system 106 generates, utilizing the subject generation machine-learning model, the subject line from the one or more subject line keywords comprises generating, utilizing the subject generation machine-learning model, a plurality of subject lines from the one or more subject line keywords; and receives, from the client device, a user selection of the subject line from among the plurality of subject lines.

In some instances, receiving the one or more subject line keywords comprises receiving a plurality of subject line keywords ordered in a first sequence. Further, in some cases, the subject line generation system 106 receives, from the client device, the plurality of subject line keywords ordered in a second sequence that differs from the first sequence; and generates, utilizing the subject generation machine-learning model, an additional subject line from the plurality of subject line keywords ordered in the second sequence.

In some embodiments, the subject line generation system 106 receives, from the client device, a request to generate an additional subject line; and generates, utilizing the subject generation machine-learning model, at least one additional subject line in response to receiving the request.

Additionally, in some embodiments, the subject line generation system 106 provides, for display on the client device, an interactive element for selecting a creativity score for generating the subject line; and modifies a parameter of the subject generation machine-learning model in accordance with the creativity score selected via the interactive element.

To provide another illustration, in one or more embodiments, the subject line generation system 106 receives, from a client device, one or more subject line keywords; generates a subject line from the one or more subject line keywords utilizing a subject generation machine-learning model comprising a sequence-to-sequence neural network having parameters determined using keywords extracted from text via a named entity recognition model; and provides, for display on the client device, the subject line.

In some cases, generating the subject line from the one or more subject line keywords utilizing the subject generation machine-learning model comprising the sequence-to-sequence neural network comprises generating the subject line from the one or more subject line keywords utilizing the sequence-to-sequence neural network comprising an encoder having one or more neural network transformer layers and a decoder having one or more additional neural network transformer layer. In some instances, the subject line generation system 106 further receives, from the client device, one or more emotion indicators for the subject line. Accordingly, in some implementations, generating the subject line from the one or more subject line keywords utilizing the subject generation machine-learning model comprising the sequence-to-sequence neural network comprises generating the subject line from the one or more subject line keywords utilizing the sequence-to-sequence neural network having the parameters further determined using emotions identified from the text via an emotion classification neural network.

In some embodiments, receiving, from the client device, the one or more subject line keywords comprises receiving a custom subject line keyword that is associated with the client device; and generating the subject line from the one or more subject line keywords utilizing the subject generation machine-learning model comprising the sequence-to-sequence neural network comprises generating the subject line from the custom subject line keyword utilizing the sequence-to-sequence neural network having the parameters modified using a plurality of custom subject line keywords associated with the client device subsequent to determining the parameters using the keywords extracted from the text via the named entity recognition model.

Further, in some cases, the subject line generation system 106 receives, from the client device, a blacklist including one or more words to omit from the subject line; and receives the one or more subject line keywords comprises receiving a keyword that is included in the blacklist. As such in some instances, generating the subject line from the one or more subject line keywords utilizing the subject generation machine-learning model comprises generating, utilizing the subject generation machine-learning model, the subject line from the one or more subject line keywords in accordance with the blacklist by omitting the keyword included in the blacklist from the subject line.

In some embodiments, the series of acts 1200 further include acts for training a sequence-to-sequence neural network to generate subject lines. To provide another example, in some embodiments, the subject line generation system 106 receives training subject line keywords extracted from training subject lines by a named entity recognition model; generates, utilizing a sequence-to-sequence neural network, predicted subject lines from the training subject line keywords extracted by the named entity recognition model; and trains the sequence-to-sequence neural network to generate subject lines based on comparisons of the predicted subject lines and the training subject lines.

In some cases, the subject line generation system 106 further determines parameters of the named entity recognition model by: generating, utilizing the named entity recognition model, predicted keywords from one or more training subject lines; and modifying the parameters of the named entity recognition model based on comparisons of the predicted keywords with labels associated with the one or more training subject lines.

In some implementations, training the sequence-to-sequence neural network to generate the subject lines based on the comparisons of the predicted subject lines and the training subject lines comprises iteratively modifying parameters of the sequence-to-sequence neural network based on the comparisons of the predicted subject lines and the training subject lines. Further, in some instances, receiving the training subject line keywords extracted from the training subject lines by the named entity recognition model comprises receiving custom subject line keywords extracted from the training subject lines by the named entity recognition model; and generating, utilizing the sequence-to-sequence neural network, the predicted subject lines from the training subject line keywords extracted by the named entity recognition model comprises generating, utilizing the sequence-to-sequence neural network, the predicted subject lines from the custom subject line keywords extracted by the named entity recognition model.

Further, in one or more embodiments, the subject line generation system 106 implements the sequence-to-sequence neural network trained using the training subject line keywords extracted by the named entity recognition model by: receiving, from a client device, one or more subject line keywords; and generating, utilizing the sequence-to-sequence neural network, a subject line by selecting one or more words for the subject line from a word distribution based on the one or more subject line keywords.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa).

For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
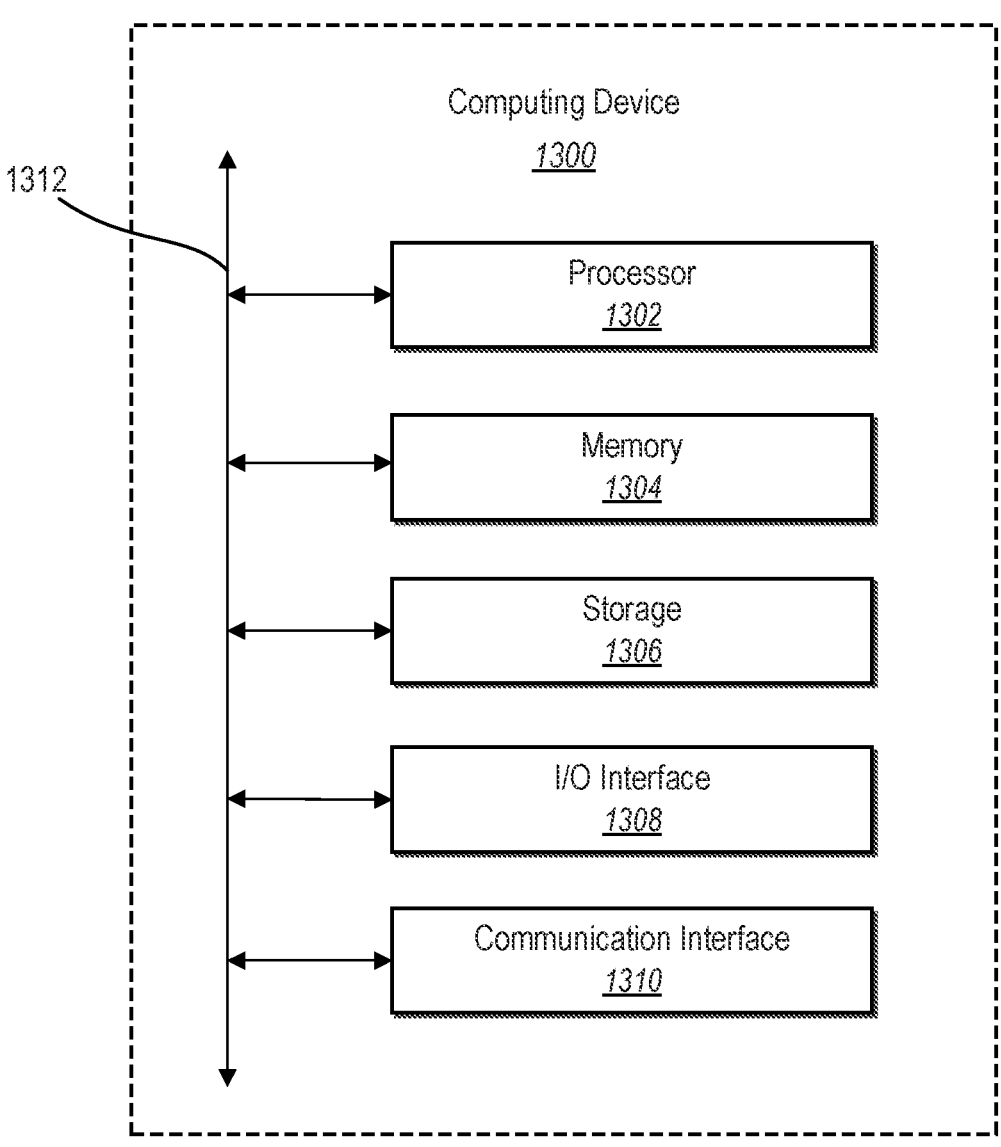
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 102 and/or the client devices 110a-110n). In one or more embodiments, the computing device 1300 may be a mobile device (e.g., a mobile telephone, a smartphone, a PDA, a tablet, a laptop, a camera, a tracker, a watch, a wearable device). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 including storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:

one or more memory components; and one or more processing devices coupled to the one or more memory components, the one or more processing devices to perform operations comprising:

receiving training subject line keywords extracted from training subject lines by a named entity recognition model that includes a transformer-based bidirectional neural network;

determining, using an emotion classification neural network, one or more training emotions from the training subject lines;

generating, utilizing a sequence-to-sequence neural network having an encoder-decoder architecture, predicted subject lines from the training subject line keywords extracted by the named entity recognition model and the one or more training emotions determined by the emotion classification neural network; and training, based on comparisons of the predicted subject lines and the training subject lines, the sequence-to-sequence neural network to generate a plurality of subject lines in response to receiving user input including a creativity score, a number of subject lines to create, and one or more subject line keywords for creating the number of subject lines.

2. The system of claim 1, wherein the operations further comprise determining parameters of the named entity recognition model by:

generating, utilizing the named entity recognition model, predicted keywords from one or more training subject lines; and modifying the parameters of the named entity recognition model based on comparisons of the predicted keywords with labels associated with the one or more training subject lines.

3. The system of claim 1, wherein:

training the sequence-to-sequence neural network to generate the plurality of subject lines based on the comparisons of the predicted subject lines and the training subject lines comprises iteratively modifying parameters of the sequence-to-sequence neural network based on the comparisons of the predicted subject lines and a first subset of training subject lines from the training subject lines; and the operations further comprise training the emotion classification neural network to determine the one or more training emotions uses a second subset of training subject lines from the training subject lines that differs from the first subset of training subject lines.

4. The system of claim 1, wherein:

receiving the training subject line keywords extracted from the training subject lines by the named entity recognition model comprises receiving custom subject line keywords extracted from the training subject lines by the named entity recognition model; and generating, utilizing the sequence-to-sequence neural network, the predicted subject lines from the training subject line keywords extracted by the named entity recognition model comprises generating, utilizing the sequence-to-sequence neural network, the predicted subject lines from the custom subject line keywords extracted by the named entity recognition model.

5. The system of claim 1, wherein the operations further comprise implementing the sequence-to-sequence neural network trained using the training subject line keywords extracted by the named entity recognition model by:

receiving, from a client device, user input including at least one creativity score, at least one number of subject lines to create, and at least one subject line keyword for creating the at least one number of subject lines; and generating, utilizing the sequence-to-sequence neural network, a plurality of subject lines that corresponds to the at least one number of subject lines by selecting one or more words for each subject line from a word distribution based on the at least one creativity score and the at least one subject line keyword.

6. A method comprising:

receiving training subject line keywords extracted from training subject lines by a named entity recognition model that includes a transformer-based bidirectional neural network;

determining, using an emotion classification neural network, one or more training emotions from the training subject lines;

generating, utilizing a sequence-to-sequence neural network having an encoder-decoder architecture, predicted subject lines from the training subject line keywords extracted by the named entity recognition model and the one or more training emotions determined by the emotion classification neural network; and training, based on comparisons of the predicted subject lines and the training subject lines, the sequence-to-sequence neural network to generate a plurality of subject lines in response to receiving user input including a creativity score, a number of subject lines to create, and one or more subject line keywords for creating the number of subject lines.

7. The method of claim 6, further comprising determining parameters of the named entity recognition model by:

generating, utilizing the named entity recognition model, predicted keywords from one or more training subject lines; and modifying the parameters of the named entity recognition model based on comparisons of the predicted keywords with labels associated with the one or more training subject lines.

8. The method of claim 6, wherein training the sequence-to-sequence neural network to generate the plurality of subject lines based on the comparisons of the predicted subject lines and the training subject lines comprises iteratively modifying parameters of the sequence-to-sequence neural network based on the comparisons of the predicted subject lines and a first subset of training subject lines from the training subject lines; and further comprising training the emotion classification neural network to determine the one or more training emotions uses a second subset of training subject lines from the training subject lines that differs from the first subset of training subject lines.

9. The method of claim 6, wherein:

receiving the training subject line keywords extracted from the training subject lines by the named entity recognition model comprises receiving custom subject line keywords extracted from the training subject lines by the named entity recognition model; and generating, utilizing the sequence-to-sequence neural network, the predicted subject lines from the training subject line keywords extracted by the named entity recognition model comprises generating, utilizing the sequence-to-sequence neural network, the predicted subject lines from the custom subject line keywords extracted by the named entity recognition model.

10. The method of claim 6, further comprising implementing the sequence-to-sequence neural network trained using the training subject line keywords extracted by the named entity recognition model by:

receiving, from a client device, user input including at least one creativity score, at least one number of subject lines to create, and at least one subject line keyword for creating the at least one number of subject lines; and generating, utilizing the sequence-to-sequence neural network, a plurality of subject lines that corresponds to the at least one number of subject lines by selecting one or more words for each subject line from a word distribution based on the at least one creativity score and the at least one subject line keyword.

11. A non-transitory computer-readable medium storing executable instructions, which when executed by a processing device, cause the processing device to perform operations comprising:

receiving training subject line keywords extracted from training subject lines by a named entity recognition model that includes a transformer-based bidirectional neural network;

determining, using an emotion classification neural network, one or more training emotions from the training subject lines;

generating, utilizing a sequence-to-sequence neural network having an encoder-decoder architecture, predicted subject lines from the training subject line keywords extracted by the named entity recognition model and the one or more training emotions determined by the emotion classification neural network; and training, based on comparisons of the predicted subject lines and the training subject lines, the sequence-to-sequence neural network to generate a plurality of subject lines in response to receiving user input including a creativity score, a number of subject lines to create, and one or more subject line keywords for creating the number of subject lines.

12. The non-transitory computer-readable medium of claim 11, wherein the operations further comprise determining parameters of the named entity recognition model by:

generating, utilizing the named entity recognition model, predicted keywords from one or more training subject lines; and modifying the parameters of the named entity recognition model based on comparisons of the predicted keywords with labels associated with the one or more training subject lines.

13. The non-transitory computer-readable medium of claim 11, wherein training the sequence-to-sequence neural network to generate the plurality of subject lines based on the comparisons of the predicted subject lines and the training subject lines comprises iteratively modifying parameters of the sequence-to-sequence neural network based on the comparisons of the predicted subject lines and a first subset of training subject lines from the training subject lines; and the operations further comprise training the emotion classification neural network to determine the one or more training emotions uses a second subset of training subject lines from the training subject lines that differs from the first subset of training subject lines.

14. The non-transitory computer-readable medium of claim 11, wherein:

receiving the training subject line keywords extracted from the training subject lines by the named entity recognition model comprises receiving custom subject line keywords extracted from the training subject lines by the named entity recognition model; and generating, utilizing the sequence-to-sequence neural network, the predicted subject lines from the training subject line keywords extracted by the named entity recognition model comprises generating, utilizing the sequence-to-sequence neural network, the predicted subject lines from the custom subject line keywords extracted by the named entity recognition model.

15. The non-transitory computer-readable medium of claim 11, wherein the operations further comprise implementing the sequence-to-sequence neural network trained using the training subject line keywords extracted by the named entity recognition model by:

receiving, from a client device, user input including at least one creativity score, at least one number of subject lines to create, and at least one subject line keyword for creating the at least one number of subject lines; and generating, utilizing the sequence-to-sequence neural network, a plurality of subject lines that corresponds to the at least one number of subject lines by selecting one or more words for each subject line from a word distribution based on the at least one creativity score and the at least one subject line keyword.

* * * * *